United States Patent [19]

Okada

[11] Patent Number: 5,365,799
[45] Date of Patent: Nov. 22, 1994

[54] SENSOR FOR FORCE/ACCELERATION/MAGNETISM USING PIEZOELECTRIC ELEMENT

[76] Inventor: Kazuhiro Okada, 73, Sugaya 4-Chome, Ageo-Shi, Saitama 362, Japan

[21] Appl. No.: 984,435
[22] PCT Filed: Jul. 9, 1992
[86] PCT No.: PCT/JP92/00882
§ 371 Date: Mar. 5, 1993
§ 102(e) Date: Mar. 5, 1993
[87] PCT Pub. No.: WO93/02342
PCT Pub. Date: Feb. 4, 1993

[30] Foreign Application Priority Data

Jul. 17, 1991 [JP] Japan .................. 3-203876

[51] Int. Cl.⁵ ............................................. G01L 1/00
[52] U.S. Cl. ....................... 73/862.041; 73/862.043; 73/862.68
[58] Field of Search ....... 310/329; 73/567 R, DIG. 4, 73/721, 727, 862.041, 862.042, 862.043, 862.628, 862.632, 862.637, 862.68

[56] References Cited

U.S. PATENT DOCUMENTS

| | | | |
|---|---|---|---|
| 2,386,279 | 10/1945 | Tibbetts | 310/329 |
| 2,848,892 | 8/1958 | Hoffman | 73/862.632 |
| 3,124,770 | 3/1964 | Ciavatta | 73/862.632 |
| 3,149,488 | 9/1964 | Castro | 73/727 |
| 3,247,711 | 4/1966 | Howatt | 73/862.632 |
| 3,252,016 | 5/1966 | Hayer, Jr. et al. | 310/329 |
| 3,456,226 | 7/1969 | Vick | 73/862.632 |
| 3,582,691 | 6/1971 | Sonderegger | 310/8.4 |
| 4,173,900 | 11/1979 | Tanabe et al. | 73/721 |
| 4,530,244 | 7/1985 | Starr | 73/721 |
| 4,896,543 | 1/1990 | Gullman | 73/862.041 |
| 4,905,523 | 3/1990 | Okada | 73/862.04 |
| 4,938,065 | 7/1990 | Kobayashi | 73/517 R |
| 4,967,605 | 11/1990 | Okada | 73/862.04 |
| 4,969,366 | 11/1990 | Okada | 73/862.08 |
| 5,014,415 | 5/1991 | Okada | 29/62.1 |
| 5,035,148 | 7/1991 | Okada | 73/862.04 |
| 5,092,645 | 3/1992 | Okada | 294/86.4 |

FOREIGN PATENT DOCUMENTS

| | | | |
|---|---|---|---|
| 0100501 | 7/1982 | European Pat. Off. | 310/329 |
| 0133997 | 3/1985 | European Pat. Off. | 364/558 |
| 0270693 | 6/1988 | European Pat. Off. | |
| 0312605 | 4/1989 | European Pat. Off. | 324/259 |
| 63-127134 | 5/1988 | Japan | |
| 9113364 | 9/1991 | WIPO | 310/329 |

Primary Examiner—Richard E. Chilcot, Jr.
Assistant Examiner—R. Biegel
Attorney, Agent, or Firm—Ladas & Parry

[57] ABSTRACT

A sensor for force, acceleration or magnetism is provided which can carries out high accuracy detection without temperature compensation and easily manufactured. The peripheral portion of a disk-shaped substrate (10) having flexibility is fixed to a sensor casing (60), and a working body (50) is connected to the center portion. With respect to the origin (O) within the substrate (10), an X, Y and Z three-dimensional coordinate system is defined, and four sets of detection elements (D1 to D4) are arranged. Respective detection elements are of a sandwich structure in which piezoelectric elements (21, 23) are put between upper electrodes (31 to 34) and lower electrodes (41 to 44). When a force Fx in the X-axis direction is applied to the working body (50) by application of an acceleration, the substrate (10) is bent, so positive or negative charges are produced in respective electrodes. How charges are produced depends upon the direction of an applied force, and a quantity of charges produced depends upon the magnitude of the applied force. Thus, it is possible to detect components in respective axial directions of an applied force on the basis of a pattern of charges produced.

23 Claims, 12 Drawing Sheets

| E | Fx | Fy | Fz |
|---|----|----|----|
| 32 | − | 0 | − |
| 42 | + | 0 | + |
| 41 | − | 0 | − |
| 31 | + | 0 | + |
| 34 | − | 0 | + |
| 44 | + | 0 | − |
| 43 | − | 0 | + |
| 33 | + | 0 | − |

FIG. 7a     FIG. 7b
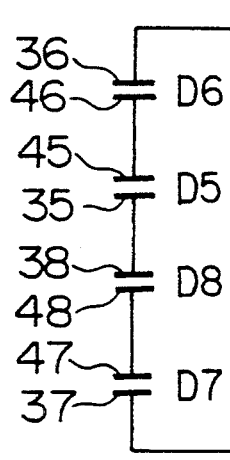
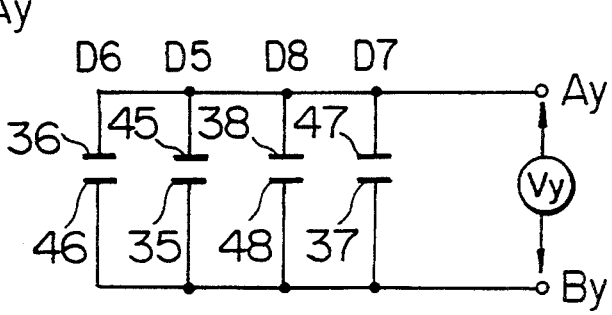
FIG. 8
| E | Fx | Fy | Fz |
|---|----|----|----|
| 36 | O | − | − |
| 46 | O | + | + |
| 45 | O | − | − |
| 35 | O | + | + |
| 38 | O | − | + |
| 48 | O | + | − |
| 47 | O | − | + |
| 37 | O | + | − |

| E | Fx | Fy | Fz |
|---|----|----|----|
| 32 | − | 0 | − |
| 42 | + | 0 | + |
| 41 | − | 0 | − |
| 31 | + | 0 | + |
| 33 | + | 0 | − |
| 43 | − | 0 | + |
| 44 | + | 0 | − |
| 34 | − | 0 | + |

SENSOR FOR FORCE/ACCELERATION/MAGNETISM USING PIEZOELECTRIC ELEMENT

TECHNICAL FIELD

This invention relates to a sensor for force/acceleration/magnetism using piezoelectric element, and more particularly to a sensor capable of detecting force, acceleration or magnetism every respective components in multi-dimensional directions.

BACKGROUND ART

In the automobile industry, or the machinery industry, there has been an increased demand for sensors capable of precisely detecting a physical quantity such as force, acceleration or magnetism. Particularly, miniaturized sensors capable of detecting such physical quantities every respective components in two-dimensional or three-dimensional directions are desired.

In order to cope with such demand, there has been proposed a force sensor in which gauge resistors are formed on a substrate made of semiconductor such as silicon, etc. to transform a mechanical distortion produced in the substrate on the basis of a force applied from the external to an electric signal by making use of a piezo resistance effect. If a weight body is attached to the detecting portion of this force sensor, an acceleration sensor for detecting an acceleration applied to the weight body can be realized. Further, if a magnetic body is attached thereto, a magnetic sensor for detecting a magnetism applied to a magnetic body can be realized. For example, sensors based on the above-described principle are disclosed in International Publications No. WO88/08521 and No. WO89/02587 based on the Patent Cooperation Treaty.

Further, in a Japanese Patent Application No. 274299/1990, a sensor utilizing a change in electrostatic capacity between two electrodes, and a sensor of a structure including a piezoelectric element put between two electrode plates are disclosed. These sensors allow a spacing or interval between two electrode plates to be varied by an action of force, acceleration or magnetism, etc., thus to detect a change in the interval as a change of an electrostatic capacitance, or a change of a quantity of charges produced in the piezoelectric element.

Generally, since a gauge resistor or a piezo resistance element has a temperature dependency, in the above-described sensor using semiconductor substrate, if there occurs a change in temperature of an environment where it is used, a detected value will include an error. Accordingly, in order to carry out a precise measurement, it is necessary to carry out a temperature compensation. Particularly, in the case where such a sensor is used in the field such as an automotive vehicle, etc., a temperature compensation is required with respect to a relatively broad operating temperature range of −40° to +120° C.

Furthermore, the above-described sensor utilizing a change of electrostatic capacitance has a merit that a manufacturing cost is low, but a drawback that signal processing is difficult because an electrostatic capacitance formed is small. In addition, the conventionally proposed sensor utilizing piezoelectric element has a problem that there is difficulty in manufacturing because it is necessary to put a piezoelectric element between electrodes.

With the above in view, an object of this invention is to provide a sensor for force, acceleration or magnetism, which is capable of carrying out a high precision detection without temperature compensation, and which can be easily manufactured.

DISCLOSURE OF INVENTION (1) A first feature of this invention is directed to a force sensor using piezoelectric element, wherein there are prepared four sets of detection elements each comprised of a piezoelectric element in a plate form, a first electrode formed on a first surface of the piezoelectric element, and a second electrode formed on a second surface of the piezoelectric element, wherein an origin is defined at a point within a substrate having flexibility, an X-axis is defined so that it passes through the origin and extends in a direction parallel to the substrate surface, two sets of the prepared four sets of detection elements and the other two sets thereof are arranged along the X-axis in such a manner that they are respectively in line on the positive side of the X-axis and on the negative side thereof, and the second electrodes of the respective detection elements are fixed on the substrate, wherein a peripheral portion of the outside of the substrate is fixed to a sensor casing, and wherein a working body having a function to transmit, to the origin, a force produced on the basis of a physical action applied from the external is provided, thus to detect the force produced in the working body on the basis of charges produced in the respective electrodes of the four sets of detection elements.

(2) A second feature of this invention resides in that, in the above-described force sensor according to the first feature, the relationship between the inside (the side of the origin) and the outside (the side of the peripheral portion) of the substrate is reversed. A force applied to the working body is transmitted to the peripheral portion of the outside of the substrate, and a portion in a vicinity of the origin is fixed to the sensor casing.

(3) A third feature of this invention is directed to a force sensor using piezoelectric element, wherein there are prepared four sets of detection elements each comprised of a piezoelectric element in a plate form, a first electrode formed on a first surface of the piezoelectric element, and a second electrode formed on a second surface of the piezoelectric element, wherein an origin is defined at a point within a substrate having flexibility, an X-axis is defined so that it passes through the origin and extends in a direction parallel to the substrate surface, a Z-axis is defined so that it passes through the origin and extends in a direction perpendicular to the substrate surface, the prepared four sets of detection elements are respectively arranged in line in such a manner that a first detection element is at the outside of the substrate in a negative region of the X-axis, a second detection element is at the inside of the substrate in the negative region of the X-axis, a third detection element is at the inside of the substrate in a positive region of the X-axis, and a fourth detection element is at the outside of the substrate in the positive region of the X-axis, and the second electrodes of the respective detection elements are fixed to the substrate, wherein a peripheral portion of the outside of the substrate is fixed to a sensor casing, wherein a working body having a function to transmit, to the origin, a force produced on the basis of a physical action applied from the external is provided, and wherein potentials of the first electrodes with respect to the second electrodes fixed on the substrate in the respective detection elements are obtained, to detect a force in the X-axis direction produced in the working body on the basis of a difference between a sum of a potential on the first detection element and a potential on the third detection element and a sum of a potential on the second detection element and a potential on the fourth detection element, and to detect a force in the Z-axis direction produced in the working body on the basis of a difference between a sum of a potential on the first detection element and a potential on the fourth detection element and a sum of a potential on the second detection element and a potential on the third detection element.

(4) A fourth feature of this invention resides in that, in the above-described force sensor according to the third feature, the relationship between the inside (the side of the origin) and the outside (the side of the peripheral portion) of the substrate is reversed. A force applied to the working body is transmitted to the peripheral portion of the outside of the substrate, and a portion in a vicinity of the origin is fixed to a sensor casing.

(5) A fifth feature of this invention is directed to a force sensor using piezoelectric element, wherein there are prepared eight sets of detection elements each comprised of a piezoelectric element in a plate form, a first electrode formed on a first surface of the piezoelectric element, and a second electrode formed on a second surface of the piezoelectric element, wherein an origin is defined at a point within a substrate having flexibility, an X-axis is defined so that it passes through the origin and extends in a direction parallel to the substrate surface, a Y-axis is defined so that it is perpendicular to the X-axis at the origin and extends in a direction parallel to the substrate surface, and a Z-axis is defined so that it passes through the origin and extends in a direction perpendicular to the substrate surface, wherein four of the prepared eight sets of detection elements are respectively arranged in line along the X-axis in such a manner that a first detection element is at the outside of the substrate in a negative region of the X-axis, a second detection element is at the inside of the substrate in the negative region of the X-axis, a third detection element is at the inside of the substrate in a positive region of the X-axis, a fourth detection element is at the outside of the substrate in the positive region of the X-axis, and the second electrodes of these respective detection elements are fixed to the substrate, wherein the other four of the prepared eight sets of detection elements are respectively arranged in line along the Y-axis in such a manner that a fifth detection element is at the outside of the substrate in a negative region of the Y-axis, a sixth detection element is at the inside of the substrate in the negative region of the Y-axis, a seventh detection element is at the inside of the substrate in a positive region of the Y-axis, and an eighth detection element is at the outside of the substrate in the positive region of the Y-axis, and the second electrodes of these respective detection elements are fixed to the substrate, wherein a peripheral portion of the outside of the substrate is fixed to a sensor casing, and wherein a working body having a function to transmit, to the origin, a force produced on the basis of a physical action applied from the external is provided, and wherein potentials of the first electrodes with respect to the second electrodes fixed on the substrate in the respective detection elements are obtained, to detect a force in the X-axis direction produced in the working body on the basis of a difference between a sum of a potential on the first detection element and a potential on the third detection element and a sum of a potential on the second detection element and a potential on the fourth detection element, to detect a force in the Y-axis direction produced in the working body on the basis of a difference between a sum of a potential on the fifth detection element and a potential on the seventh detection element and a sum of a potential on the sixth detection element and a potential on the eighth detection element, and to detect a force in the Z-axis direction produced in the working body on the basis of a diffrence between a sum of a potential on the first detection element and a potential on the fourth detection element and a sum of a potential on the second detection element and a potential on the third detection element, a difference between a sum of a potential on the fifth detection element and a potential on the eighth detection element and a sum of a potential on the sixth detection element and a potential on the seventh detection element, or a difference between a sum total of a potential on the first detection element, a potential on the fourth detection element, a potential on the fifth detection element, and a potential on the eighth detection element and a sum total of a potential on the second detection element, a potential on the third detection element, a potential on the sixth detection element, and a potential on the seventh detection element.

(6) A sixth feature of this invention resides in that, in the above-described force sensor according to the fifth feature, the relationship between the inside (the side of the origin) and the outside (the side of the peripheral portion) of the substarte is reversed. A force applied to the working body is transmitted to the peripheral portion at the outside of the substrate, and a portion in a vicinity of the origin is fixed to a sensor casing.

(7) A seventh feature of this invention is directed to a force sensor using piezoelectric element, wherein there are prepared twelve sets of detection elements each comprised of a piezoelectric element in a plate form, a first electrode formed on a first surface of the piezoelectric element, and a second electrode formed on a second surface of the piezoelectric element, wherein an origin is defined at a point within a substrate having flexibility, an X-axis is defined so that it passes through the origin and extends in a direction parallel to the substrate surface, a Y-axis is defined so that it is perpendicular to the X-axis at the origin and extends in a direction parallel to the substrate surface, a Z-axis is defined so that it passes through the origin and extends in a direction perpendicular to the substrate surface, and a W-axis is defined so that it intersects with respective axes of X, Y and Z at the origin and extends in a direction parallel to the substrate surface, wherein first four of the prepared twelve sets of detection elements are respectively arranged in line along the X-axis in such a manner that a first detection element is at the outside of the substrate in a negative region of the X-axis, a second detection element is at the inside of the substrate in the negative region of the X-axis, a third detection element is at the inside of the substrate in a positive region of the X-axis, and a fourth detection element is at the outside of the substrate in the positive region of the X-axis, and the second electrodes of these respective detection elements are fixed on the substrate, wherein second four of the prepared twelve sets of detection elements are respectively arranged in line along the Y-axis in such a manner that a fifth detection element is at the outside of the substrate in a negative region of the Y-axis, a sixth detection element is at the inside of the substrate in a positive region of the Y-axis, a seventh detection element is at the inside of the substrate in a positive region of the Y-axis, and an eighth detection element is at the outside of the substrate in the positive region of the Y-axis, and the second electrodes of these respective detection elements are fixed on the substrate, wherein third four of the prepared twelve sets of detection elements are respectively arranged in line along the W-axis in such a manner that a ninth detection element is at the outside of the substrate in a negative region of the W-axis, a tenth detection element is at the inside of the substrate in the negative region of the W-axis, an eleventh detection element is at the inside of the substrate in a positive region of the W-axis, and a twelveth detection element is at the outside of the substrate in the positive region of the W-axis, and the second electrodes of these respective detection elements are fixed on the substrate, wherein a peripheral portion at the outside of the substrate is fixed to a sensor casing, wherein a working body having a function to transmit, to the origin, a force produced on the basis of a physical action applied from the external is provided, and wherein potentials of the first electrodes with respect to the second electrodes fixed on the substrate in the respective detection elements are obtained, to detect a force in the X-axis direction produced in the working body on the basis of a difference between a sum of a potential on the first detection element and a potential on the third detection element and a sum of a potential on the second detection element and a potential on the fourth detection element, to detect a force in the Y-axis direction produced in the working body on the basis of a difference between a sum of a potential on the fifth detection element and a potential on the seventh detection element and a sum of a potential on the sixth detection element and a potential on the eighth detection element, and to detect a force in the Z-axis direction produced in the working body on the basis of a difference between a sum of a potential on the ninth detection element and a potential on the twelfth detection element and a sum of a potential on the tenth detection element and a potential on the eleventh detection element.

(8) An eighth feature of this invention resides in that, in the above-described force sensor according to the seventh feature, the relationship between the inside (the inside of the origin) and the outside (the side of the peripheral portion) is reversed. A force applied to the working body is transmitted to the peripheral portion at the outside of the substrate, and a portion in a vicinity of the origin is fixed to a sensor casing.

(9) Nineth to fourteenth features of this invention reside in that, in the above-described force sensors according to the third to eighth features, predetermined electrodes of the respective detection elements are connected to each other to form a plurality of detection terminals, thus to carry out detection of a force by voltages across these detection terminals.

(10) A fifteenth feature of this invention resides in that, in the above-described force sensors, a piezoelectric element comprised of a single substrate is used commonly to the plurality of detection elements.

(11) A sixteenth feature of this invention resides in that, in the above-described force sensors, a working body is caused to produce a force on the basis of an acceleration given from the external, thereby pemitting detection of acceleration.

(12) The seventeenth feature of this invention resides in that, in the above-described force sensors, a working body is constituted with a magnetic material to allow the working body to produce a force on the basis of magnetism applied from the external to thereby permit detection of magnetism.

In the force sensor according to this invention, four sets of detection elements are arranged along the X-axis which is defined on a substrate having flexibility. These detection elements are such that one electrodes are fixed on the substrate. When the outside portion (the peripheral portion side) of the substarte is fixed on the sensor casing to allow a force to be applied to the inside (the side of the origin), or the inside (the side of the origin) of the substrate is fixed on the sensor casing in a manner opposite to the above to allow a force to be applied to the outside (the peripheral portion side), a bending is produced in the substrate. The bending thus produced is transmitted to piezoelectric elements of respective detection elements. For this reason, across both electrodes of the respective detection elements, charges corresponding to the position where detection elements are arranged are produced. Accordingly, it is possible to carry out detection of force components relating to the X-axis direction by voltages based on these four sets of detection elements. In addition, the same four sets of detection elements are also able to be used for carrying out detection of force components relating to the Z-axis direction vertical to the substrate surface.

When an X-axis and a Y-axis are defined parallel to the substrate surface, and eight sets of detection elements in total are respectively arranged by four sets on these respective axes, detection of force components relating to three X, Y and Z axes can be made. In addition, in the case where there is a need of independently carrying out detection with respect to the Z-axis, it is sufficient to further supplement four sets of detection elements to thereby provide a configuration such that twelve sets of detection elements in total are arranged.

Further, if a weight body having weight to some extent is used as a working body on which a force is exerted, detection of acceleration can be made. In addition, if a magnetic body is used as the working body mentioned above, detection of magnetism can be made.

BRIEF DESCRIPTION OF DRAWINGS

FIGS. 7a and 7b are circuit diagrams each showing a detection circuit for detecting a force Fy in the Y-axis direction in the acceleration sensor shown in FIG. 1.

FIG. 8 is a table for explaining an operation of the circuits shown in FIGS. 7a and 7b.

BEST MODE FOR CARRYING OUT THE INVENTION

This invention will now be described in accordance with embodiments shown. While this invention is applicable to any one of a force sensor, an acceleration sensor and a magnetic sensor, an example where this invention is applied to the acceleration sensor will be described below.

Basic Structure of the Sensor

Figure 1:
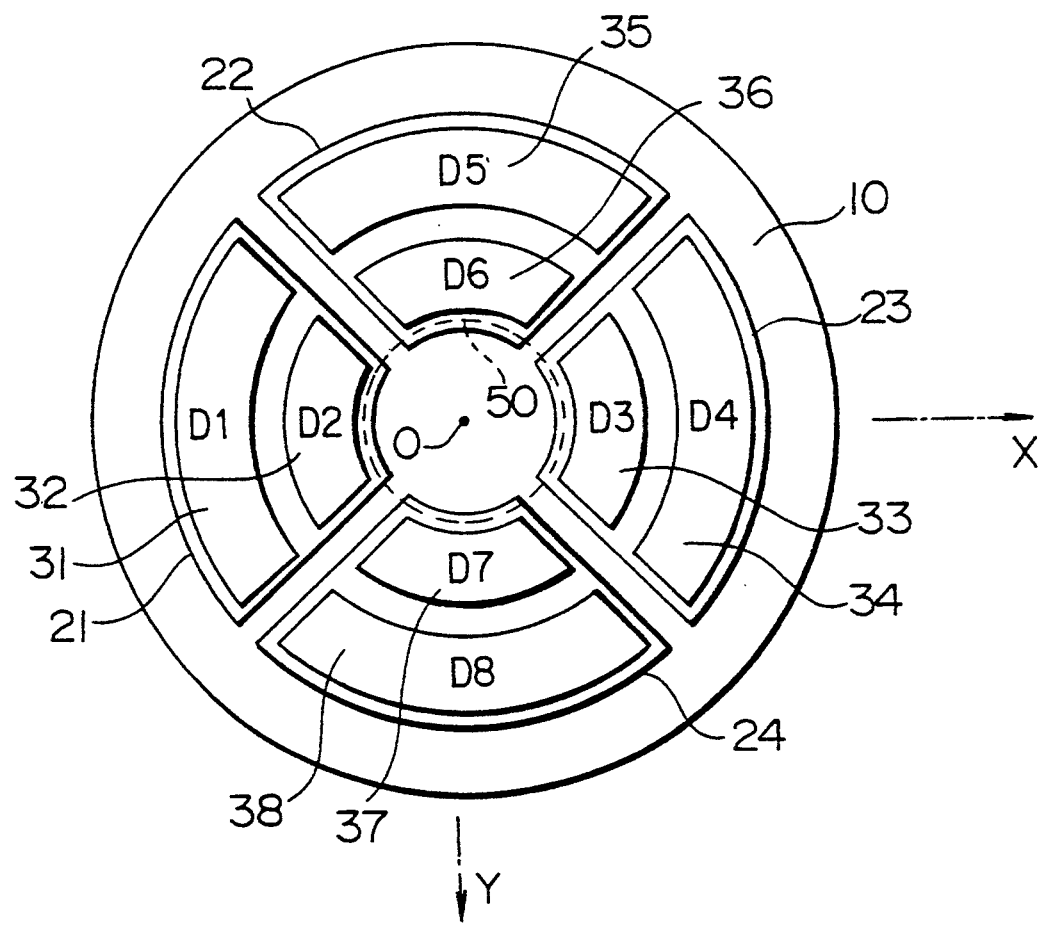
FIG. 1 is a top view of an acceleration sensor according to an embodiment of this invention.
Figure 2:
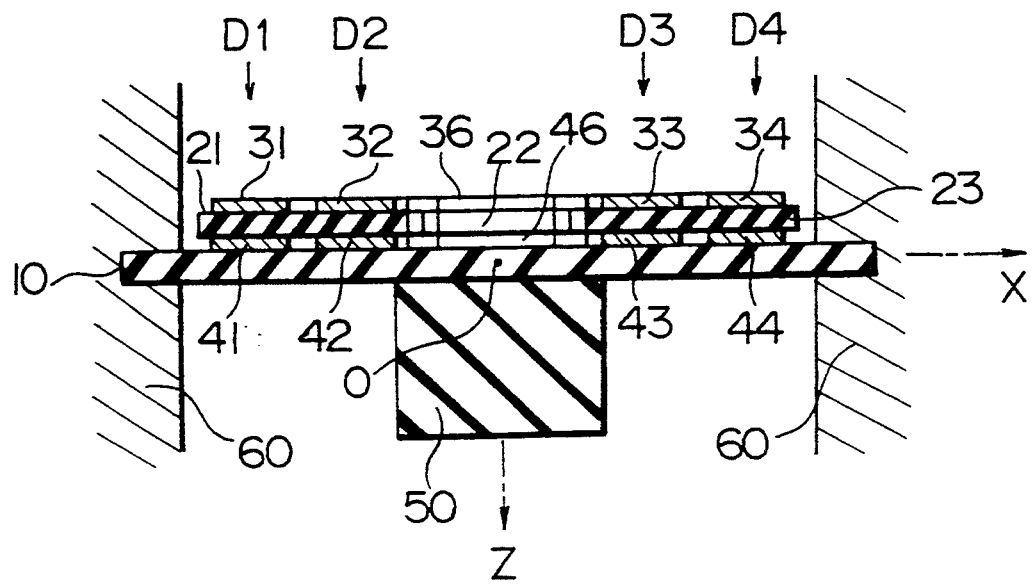
FIG. 2 is a side cross sectional view cut along the X-axis of the acceleration sensor shown in FIG. 1.

FIG. 1 is a top view of an acceleration sensor according to an embodiment of this invention, and FIG. 2 is a side cross sectional view thereof. This sensor has a disk-shaped substrate 10 having flexibility. In this specification, in consideration of convenience of explanation, an origin O is determined at a central portion of this substrate 10, and an X-axis, a Y-axis and a Z-axis are respectively taken in directions indicated by arrows in the figure, thus to define an XYZ three-dimensional coordinate system. The XY plane is a plane in parallel to the substrate surface of the substrate 10, and the Z-axis is an axis vertical thereto. FIG. 2 corresponds a cross section cut along the X-axis of the sensor shown in FIG. 1.

As shown in FIG. 1, fan-shaped piezoelectric elements 21, 22, 23 and 24 are arranged on an upper surface of the substrate 10 so as to surround the origin O, and two upper electrodes are respectively formed on upper surfaces of the piezoelectric elements. Namely, upper electrodes 31, 32 are formed on the upper surface of the piezoelectric element 21; upper electrodes 33, 34 are formed on the upper surface of the piezoelectric element 23; upper electrodes 35, 36 are formed on the upper surface of the piezoelectric element 22; and upper electrodes 37, 38 are formed on the upper surface of the piezoelectric element 24. Although not shown in FIG. 1, lower electrodes 41-48 in the same form as that of the upper electrodes 31-38 are formed in correspondence therewith on the lower surfaces of respective piezoelectric elements. The upper electrodes 31-38 and the lower electrodes 41-48 are opposite with piezoelectric elements being put therebetween. This appearance is clearly indicated by the side cross sectional view of FIG. 2. A working body 50 is connected on the lower surface of the substrate 10. The working body 50 is a columnar weight body and has a function to produce a force on the basis of an acceleration exerted thereon to transmit this force to the portion in the vicinity with the origin O of the substrate 10. Further, as shown in FIG. 2, the peripheral portion of the substrate 10 is fixedly supported by a sensor casing 60. In this specification, it is assumed that the peripheral portion of the substrate 10 and the portion in the vicinity of the origin O are called outside and inside, respectively. Eventually, the outside of the disk-shaped substrate 10 is fixed by the sensor casing 60, and the inside is in a free state.

If the substrate 10 is a substrate having flexibility, substrates of any material may be employed. The substrate 10 may be constituted with an insulating material such as glass, ceramic or resin, or may be constituted with conductive material such as metal. It is to be noted that in the case where the substrate 10 is constituted with conductive material, it is necessary to form an insulating layer on the upper surface of the substrate 10 in order to allow the lower electrodes 41-48 to be electrically independent each other. Explanation will be described by taking an example where the substrate 10 is constituted with an insulating material. Further, piezoelectric ceramic is used in this embodiment as the piezoelectric elements 21-24. Respective electrodes 31-38, 41-48 may be constituted with any material as long as that material is a conductive material. Further, since the working body 50 is only required to function as a weight body, any material may be used. However, sufficient mass is necessary in order to enhance a detection sensitivity. From a viewpoint of this, it is preferable that material having high density is used. While, in this embodiment, there is adopted a construction in which the substrate 10 and the working body 50 are separate with each other, such a construction is employed only for convenience of explanation of functions of respective portions, and there may be therefore adopted, in a practical sense, a construction in which the substrate 10 and the working body 50 are integrally formed by using the same material.

The manufacturing process for this sensor is very simple. There may be adopted a method of forming respective electrodes 31–38, 41–48 (e.g., vacuum-depositing metal) on both the surfaces of the four fan-shaped piezoelectric elements 21–24 to dispose such elements in a sandwiched form at a predetermined position of the substrate 10, and then fixing the lower surfaces of the lower electrodes 41–48 on the upper surface of the substrate 10 by bonding agent, etc. Alternatively, there may be adopted a method of forming the lower electrodes 41–48 on the substrate 10, then forming the piezoelectric ceramic by burning process thereon, and then forming the upper electrodes 31–38 thereon.

In view of consideration of an operation of this sensor, this structure can be comprehended as follows. It is now that an element assembly constituted by a piezoelectric element, an upper electrode formed on the upper surface of this piezoelectric element, and a lower electrode formed on the lower surface of the piezoelectric element will be called a set of detection element. When such definition is employed, it can be said that the sensor of this embodiment is of a structure in which eight sets of detection elements are disposed on the substrate 10. Namely, a first detection element D1 comprised of a piezoelectric element 21, and electrodes 31, 41, a second detection element D2 comprised of a piezoelectric element 21, and electrodes 32, 42, a third detection element D3 comprised of a piezoelectric element 23, and electrodes 33, 43, and a fourth detection element D4 comprised of the piezoelectric element 23, and electrodes 34, 44 are arranged in succession, from the left to the right along the X-axis direction in the figure, in order recited. On the other hand, a fifth detection element D5 comprised of a piezoelectric element 22, and electrodes 35, 45, a sixth detection element D6 comprised of the piezoelectric element 22, and electrodes 36, 46, a seventh detection element D7 comprised of a piezoelectric element 24, and electrodes 37, 47, and an eighth detection element D8 comprised of the piezoelectric element 24, and electrodes 38, 48 are arranged in succession, from the upper side to the lower side along the Y-axis direction in the figure, in order recited.

Phenomenon Occuring when Acceleration is Applied

Figure 3:
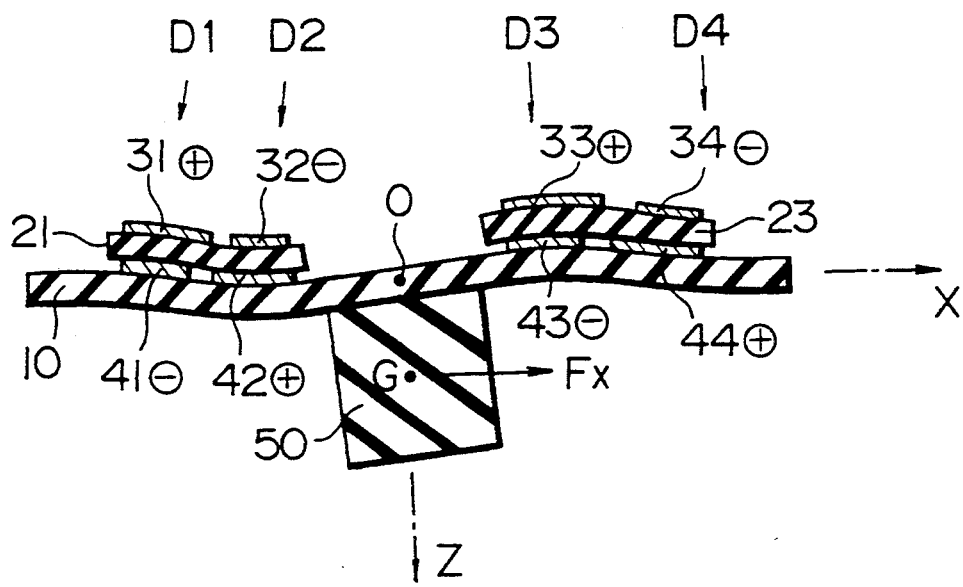
FIG. 3 is a side cross sectional view showing the state where a force Fx in the X-axis direction is applied to a center of gravity G of a working body 50 in the acceleration sensor shown in FIG. 1.

Let now consider what phenomenon takes place in the case where an acceleration is applied to the above-described acceleration sensor. Assuming now that an acceleration in the X-axis direction is applied to working body 50, a force Fx in the X-axis direction (having magnitude proportional to mass of the working body 50) will be produced at the center of gravity G of the working body 50 as shown in FIG. 3. By this force Fx, a moment in a counterclockwise direction in FIG. 3 is produced at the center of gravity G. Since the outside (peripheral portion) of the substrate 10 is fixed, the substrate 10 is bent as shown. This bending is transmitted to the piezoelectric elements and respective electrodes as it is. As a result, a deformation takes place such that a portion expands and another portion contracts (In the figure, for easiness of understanding, only the cross sectional portion is indicated, and expansion/contraction is indicated in an exaggerated manner). It is known that charges of polarities as shown in FIG. 3 are produced in respective electrodes. Namely, positive charges are produced in the electrodes 31, 42, 33 and 44, and negative charges are produced in the electrodes 41, 32, 43 and 34. It is to be noted that such a property of the piezoelectric element is discussed in, e.g., "Development of Acceleration Sensor and Acceleration Evaluation System for Super Low Range Frequency (pp37–49, No. 910273, Sensors & Actuators 1991)". As stated above, when a force Fx in the X-axis direction is applied, charges are produced between upper and lower electrodes in the detection elements D1–D4 arranged along the X-axis. On the contrary, no charge is produced between upper and lower electrodes in the detection elements D5–D8 arranged along the Y-axis. The reason why such phenomenon takes place is that the detection elements D5–D8 are arranged extending over the positive region and the negative region of the X-axis as shown in FIG. 1, charges produced at one side portion are canceled by charges produced at the other side portion, so no charge is produced as a whole.

On the other hand, when it is assumed that an acceleration in the Y-axis direction is applied to the working body 50, a force Fy in the Y-axis direction is produced at the center of gravity G of the working body 50. Also in the case, it is understood that exactly the same phenomenon will take place. It is now to be noted that charges are produced between upper and lower electrodes in the detection elements D5–D8 arranged along the Y-axis, whereas no charge is produced between upper and lower electrodes in the detection elements D1–D4.

Figure 4:
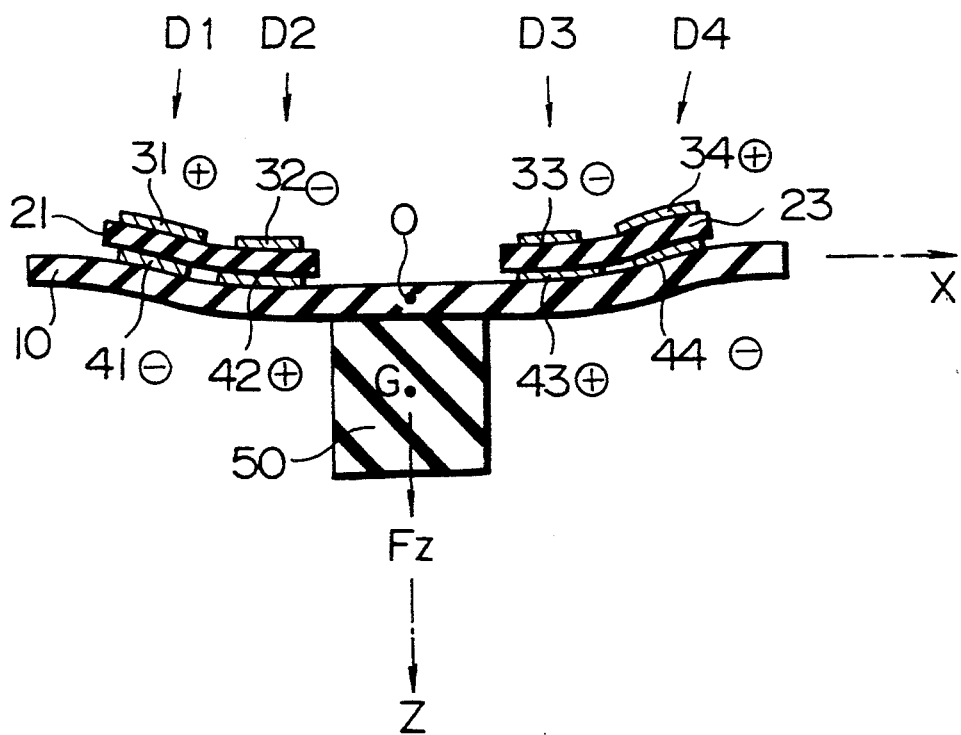
FIG. 4 is a side cross sectional view showing the state where a force Fz in the Z-axis direction is applied to the center of gravity G of the working body 50 in the acceleration sensor shown in FIG. 1.

When it is assumed that an acceleration in the Z-axis direction is applied to the working body 50, a force Fx in the Z-axis direction is exerted on the center of gravity G of the working body 50. As shown in FIG. 4, the origin O is pulled toward the downward direction of the figure by this force Fz, so the substrate 10 is bent as shown. Deformation of the piezoelectric element by this bending produces charges of the porality as shown in FIG. 4. Namely, positive charges are produced in the electrodes 31, 42, 43 and 34, and negative charges are produced in the electrodes 41, 32, 33 and 44.

As stated above, when acceleration components in the X, Y and Z axis directions are exerted on the working body 50, charges will be produce in peculiar modes peculiar to respective detection elements depending upon respective cases. In addition, a quantity of charges produced is a value related to a magnitude of an acceleration exerted, and a porality of charges produced is determined in dependency upon the direction of an acceleration exerted. For example, in FIG. 3, when a force −Fx in the negative direction of the X-axis is exerted on the center of gravity G, signs of charges produced in respective electrodes are reversed. Similarly, in FIG. 4, when a force −Fz in the negative direction of the Z-axis is exerted on the center of gravity G, signs of charges produced in respective electrodes are reversed. Eventually, by detecting charges produced in respective detection elements, it is possible to independently detect acceleration components in the X, Y and Z axis directions. This is the fundamental principle of this invention.

Detection Circuit for Acceleration

Figures 5A, 5B, 6:
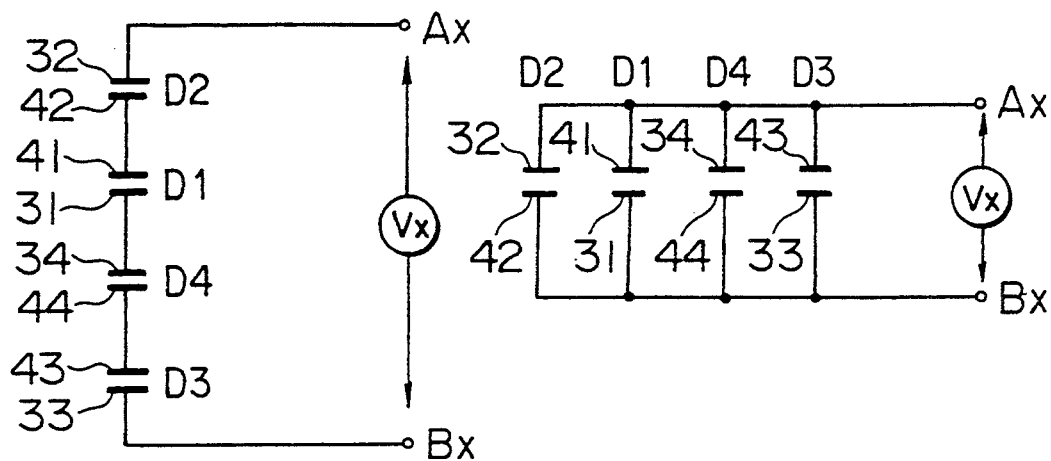
FIGS. 5a and 5b are circuit diagrams each showing a detection circuit for detecting a force Fx in the X-axis direction in the acceleration sensor shown in FIG. 1.
FIG. 6 is a table for explaining an operation of the circuits shown in FIGS. 5a and 5b.

A detection circuit for actually carrying out detection of an acceleration by using the previously described acceleration sensor will now be described. FIGS. 5a and 5b are circuit diagrams showing detection circuits for detecting a force Fx in the X-axis direction. In these figures, D1–D4 indicate respective detection elements arranged on the X-axis. In the circuit diagrams, wirings with respect to the upper and the lower electrodes of respective detection elements are indicated. A force Fx in the X-axis direction (i.e., an acceleration in the X-axis direction) can be detected by measuring a voltage Vx across terminals Ax and Bx.

FIG. 6 is a Table showing polarity of charges produced in respective electrodes when force components Fx, Fy, Fz in the respective axial directions are exerted on the working body 50. For example, the polarity signs of the column of Fx of this Table correspond to signs attached to respective electrodes shown in FIG. 3, and numerical symbols of electrodes described in the electrode column E are arranged in order of the circuit diagram of FIG. 5a. By making reference to the column of Fx in this Table, it is seen that, in the circuit diagrams of FIGS. 5a and 5b, negative charges are produced on the electrodes on the terminal Ax side of respective detection elements, and positive charges are produced on the electrodes on the terminal Bx side. For example, in the circuit of FIG. 5b, if a quantity of charges produced in respective electrodes are counted as 1, charges of −4 are collected or gathered at the terminal Ax, and charges of +4 are collected at the terminal Bx. Conversely, in the case where a force of −Fx is exerted, the polarity is reversed. As a result, charges of +4 are collected at the terminal Ax and charges of −4 are collected at the terminal Bx. Similarly, in the case of FIG. 5a, in the case where a force of +Fx is exerted, charges of −1 are gathered at the terminal Ax and charges of +1 are gathered at the terminal Bx. Conversely, in the case where a force of −Fx is exerted, the polarity is reversed. As a result, charges of +1 are gathered at the terminal Ax and charges of −1 are gathered at the terminal Bx. Eventually, a voltage Vx across the terminals Ax and Bx becomes equal to a value corresponding to the force Fx in the X-axis direction.

Let now consider what value is outputted as a voltage Vx in the case where a force Fy in the Y-axis direction is exerted. In the case where a force Fy is exerted as indicated by the column of Fy of the Table of FIG. 6, no charge is produced in respective electrodes. The reason thereof is as follows. Namely, as previously described above, since detection elements D1–D4 are arranged along the X-axis, when a force Fy in the Y-axis direction is exerted, positive and negative charges partially produced are canceled with each other. Accordingly, the voltage Vx is not influenced by the force Fy in the Y-axis direction by any means.

Let now consider what value is outputted as a voltage Vx in the case where a force Fz in the Z-axis direction is exerted. Polarity signs of the column of Fz of the Table of FIG. 6 correspond to signs attached to respective electrodes shown in FIG. 4. Considering that respective electrodes producing such charges are wired as shown in FIGS. 5a and 5b, positive and negative charges are similarly canceled. As a result, a voltage value Vx in the case where only the force Fz is exerted becomes equal to zero. Accordingly, the voltage Vx is not influenced by the force Fz in the Z-axis direction.

From the above, it is seen that in the case where three-dimensional force components F are exerted on the working body 50, only a component Fx in the X-axis direction is detected as a voltage Vx, and this detection value is not influenced by the component Fy in the Y-axis direction and the component Fz in the Z-axis direction.

FIGS. 7a and 7b are circuit diagrams showing a detection circuit for detecting a force Fy in the Y-axis direction. In these figures, D5–D8 indicate respective detection elements arranged on the Y-axis. In the circuit diagrams, wirings with respect to the upper and the lower electrodes of the respective detection elements are shown. A force component Fy in the Y-axis direction (i.e., acceleration in the Y-axis direction) can be detected by measuring a voltage Vy across the terminals Ay and By.

FIG. 8 is a Table showing polarity of charges produced in respecvtive electrodes when force components Fx, Fy and Fz in respective axial directions are exerted on the working body 50. In this Table, numerical symbols of electrodes described in the electroce column E are arranged in order of the circuit diagram of FIG. 7a. It is seen from this Table that the voltage Vy is a value determined only by the magnitude and the direction of the force Fy in the Y-axis direction. Eventually, in the case when a three-dimensional force F is exerted on the working body 50, only a component Fy in the Y-axis direction thereof is detected as a voltage Vy, and this detection value is not affected by the component Fx in the X-axis direction and the component Fz in the Z-axis direction.

Figures 9A, 9B, 10:
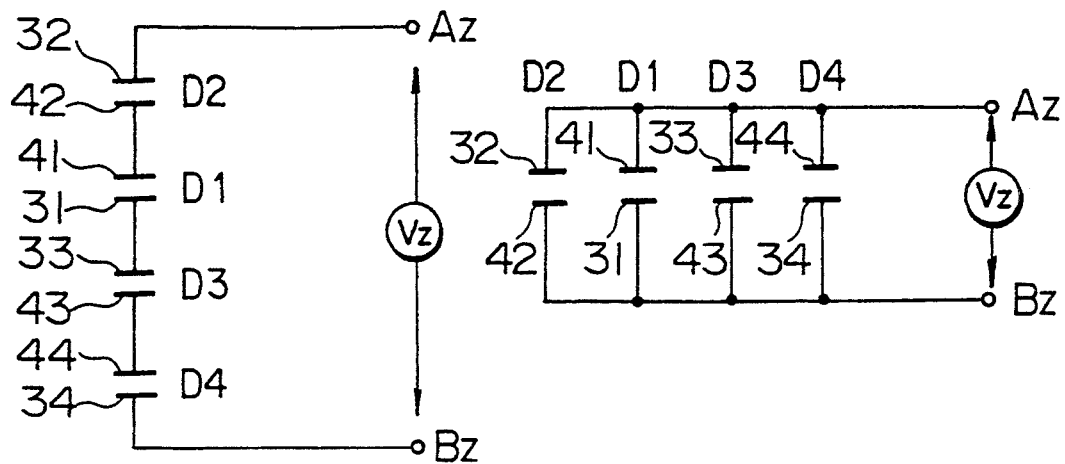
FIGS. 9a and 9b are circuit diagrams each showing a detection circuit for detecting a force Fz in the Z-axis direction in the acceleration sensor shown in FIG. 1.
FIG. 10 is a table for explaining an operation of the circuits shown in FIGS. 9a and 9b.

FIGS. 9a and 9b are circuit diagrams showing detection circuits for detecting a force Fz in the Z-axis direction. In these figures, D1–D4 indicate respective detection elements arranged on the X-axis. In the circuit diagrams, wirings with respect to the upper and the lower electrodes of respective detection elements are shown. A force component Fz in the Z-axis direction (i.e., acceleration in the Z-axis direction) can be detected by measuring a voltage Vz across the terminals Az and Bz.

FIG. 10 is a Table showing polarity of charges produced in respective electrodes when force components Fx, Fy and Fz in respective axial directions are exerted on the working body 50. Numerical symbols of electrodes described in the electrode column E are arranged in order of the circuit diagram of FIG. 9a. It is seen from this Table that the voltage Vz is a value determined by the magnitude and the direction of the force Fz in the Z-axis direction. Eventually, in the case where a three-dimensional force F is exerted on the working body 50, only a component Fz in the Z-axis direction is detected as a voltage Vz, and this detection value is not affected by the component in the X-axis direction and the component Fy in the Y-axis direction.

Figure 11A:
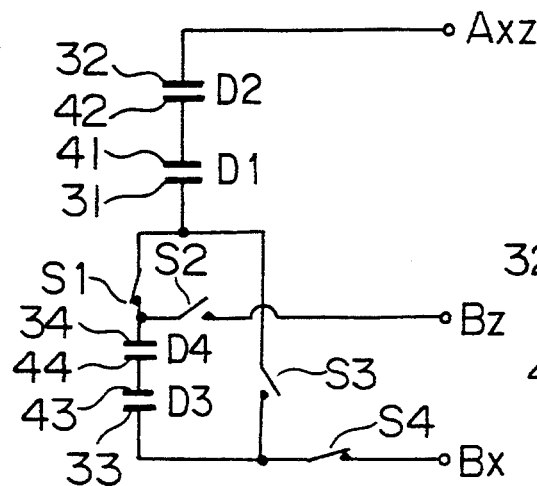
FIGS. 11a and 11b are circuit diagrams each showing a detection circuit capable of commonly carrying out detection of a force Fx in the X-axis direction and a force Fz in the Z-axis direction in the acceleration sensor shown in FIG. 1.
Figure 11B:
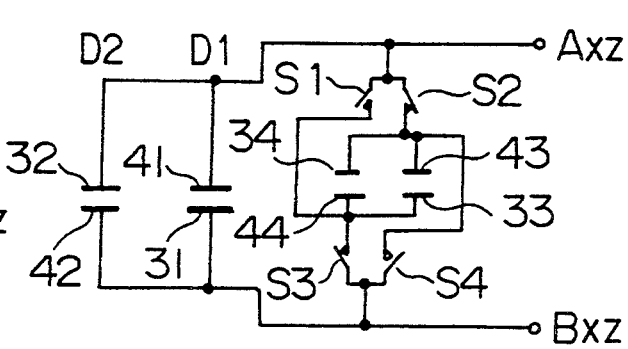

As described above, by four detection elements D1–D4 arranged along the X-axis direction, a force component Fx in the X-axis direction and a force component Fz in the Z-axis direction can be detected. Further, by four detection elements D5–D8 arranged along the Y-axis direction, a force component Fy in the Y-axis direction can be detected. Eventually, detection elements D1–D4 are commonly used for detection in the X-axis direction and detection in the Z-axis direction. Circuits for permitting such common use are shown in FIGS. 11a and 11b. The circuit of FIG. 11a constitutes a switching circuit using four switches S1–S4. A component in the X-axis direction is detected by a voltage Vx across the common terminal Axz and the terminal Bx for X-axis, and a component in the Z-axis direction is detected by a voltage Vz across the common terminal Axz and the terminal Bz for Z-axis. The switches S1 and S2 interlock with each other. Namely, if one is turned ON, the other is turned OFF. Similarly, the switches S3 and S4 interlock with each other. Namely, if one is turned ON, the other is turned OFF. As shown in the figure, when the switches S1, S2, S3 and S4 are respectively placed in ON, OFF, OFF and ON state, this circuit is equivalent to the detection circuit for the component in the X-axis direction shown in FIG. 5a. Further, when the respective switches are switched so that the switches S1, S2, S3 and S4 are in OFF, ON, ON and OFF state, this circuit is equivalent to the detection circuit for the component in the Z-axis direction shown in FIG. 7a. Similarly, the circuit of FIG. 11b can switch detection for the component in the X-axis direction and detection for the component in the Z-axis direction by operation of four switches S1-S4. As shown, when the switches S1, S2, S3 and S4 are respectively placed in OFF, ON, ON and OFF state, this circuit is equivalent to the circuit for detecting a component in the X-axis direction shown in FIG. 5b. In addition, when respective switches are switched so that the switches S1, S2, S3 and S4 are placed in ON, OFF, OFF and ON state, this circuit is equivalent to a circuit for detecting a component in the Z-axis direction shown in FIG. 7b.

Figure 12:
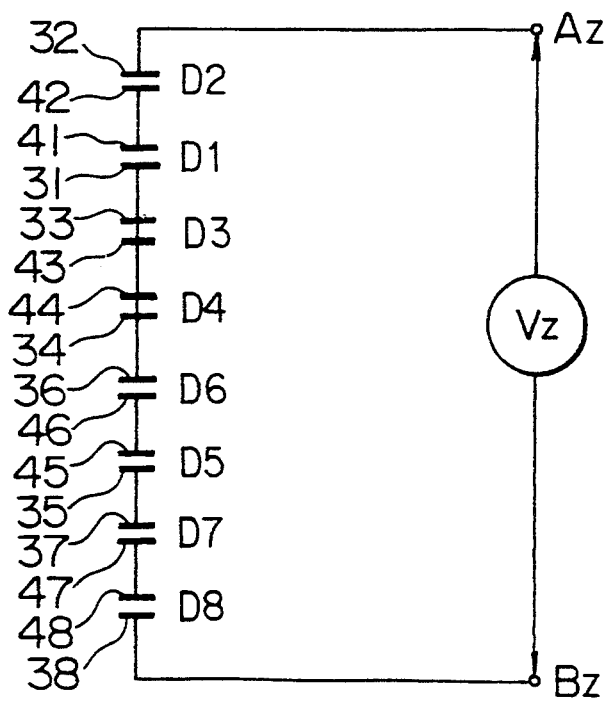
FIG. 12 is a circuit diagram showing another detection circuit for detecting a force Fz in the Z-axis direction in the acceleration sensor shown in FIG. 1.
Figure 13:
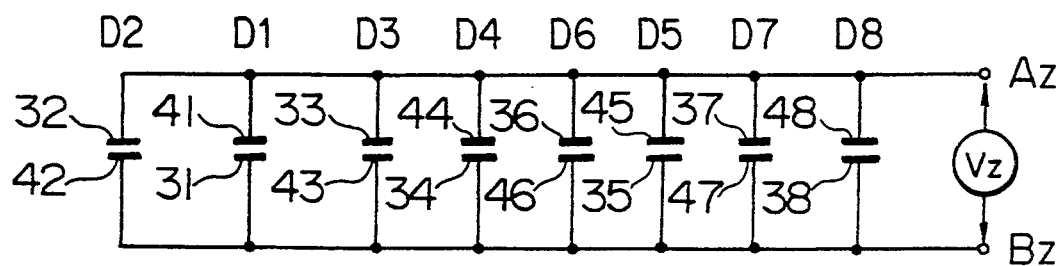
FIG. 13 is a circuit diagram showing a further detection circuit for detecting a force Fz in the Z-axis direction in the acceleration sensor shown in FIG. 1.

It is to be noted that ,detection of the force component Fz in the Z-axis direction may be carried by using detection elements D5-D8 in place of the detection elements D1-D4. In this case, the detection elements D5-D8 are commonly used for detection in the Y-axis direction and detection in the Z-axis direction. In addition, all eight detection elements D1-D8 may be used to detect a force component Fz in the Z-axis direction. In this case, a detection circuit as shown in FIG. 12 or 13 may be constructed.

The temeperature characteristic of this sensor will now be described. The piezoelectric element has a property such that charges are produced between electrodes with respect to a sudden temperature change, and is an element exhibiting so called a pyro effect (refer to FIG. 16 of the above-mentioned reference: pp37-49, No. 910273, sensors & Actuators 1991). In the sensor according to this invention, since detection values in respective axial directions of X, Y and Z are calculated on the basis of differences between voltages obtained by respective detection elements, the influence by temperature will be canceled. Accordingly, there is no necessity of additionally providing a circuit for temperature compensation.

Other Embodiments of the Sensor

Figure 14:
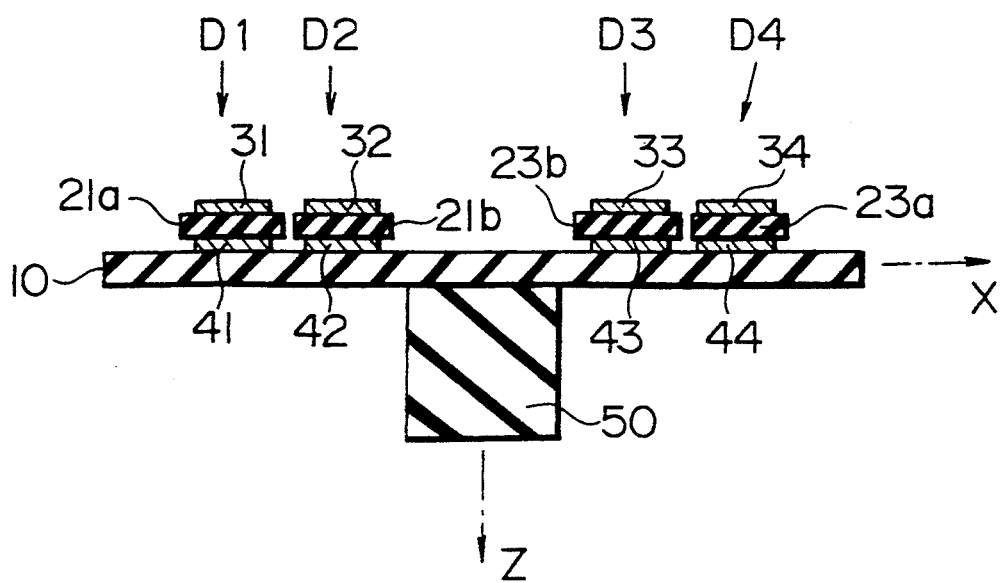
FIG. 14 is a side cross sectional view of an acceleration sensor according to another embodiment of this invention wherein only a cross sectional portion is shown.
Figure 15:
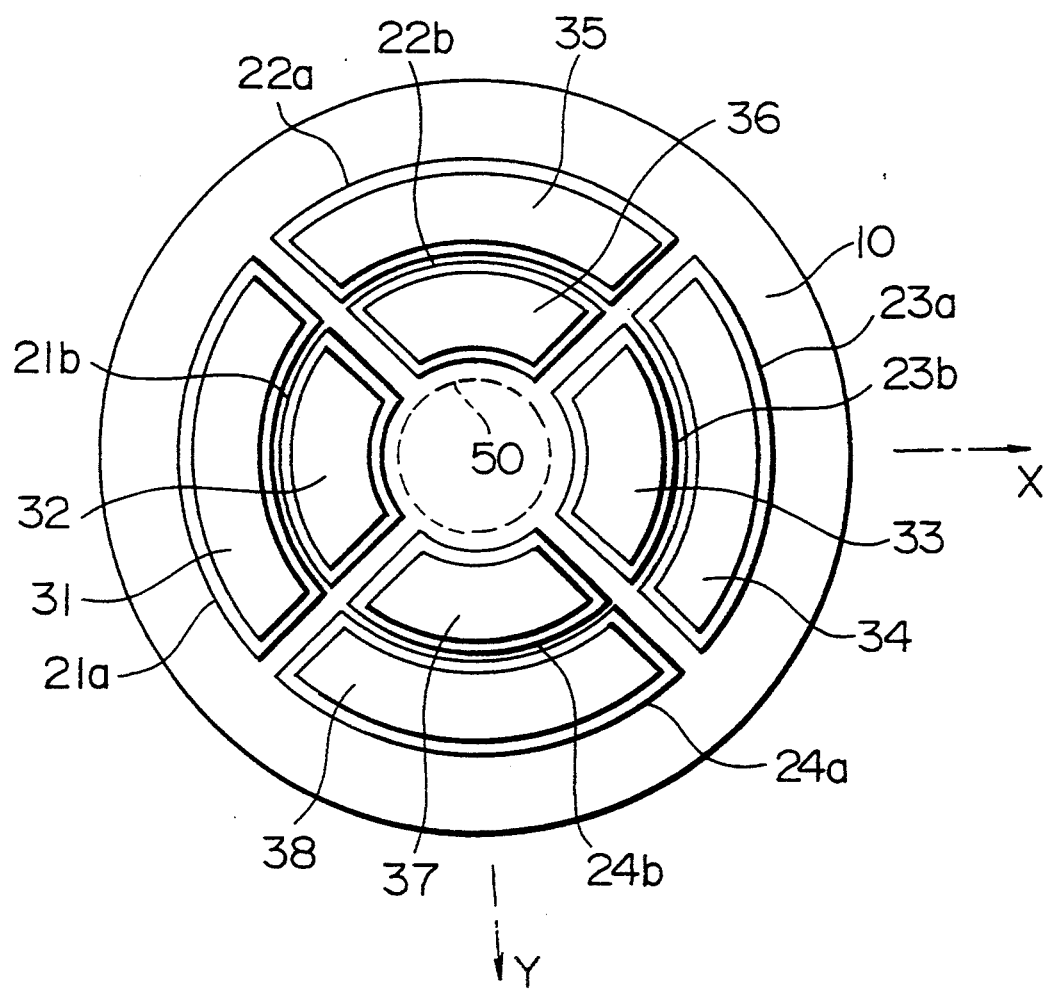
FIG. 15 is a top view of the acceleration sensor shown in FIG. 14.

Another structure of an acceleration sensor according to this invention will now be disclosed. FIG. 14 is a side cross sectional view of a sensor of this structure, and FIG. 15 is a top view thereof. The cross section cut along the X-axis of the sensor shown in FIG. 15 corresponds to FIG. 14. It is to be noted that, in the side cross sectional view of FIG. 14, only the sectional portion is indicated in order to avoid that the figure becomes complicated. The sensor in this embodiment differs from the sensor shown in FIGS. 1 and 2 in that independent piezoelectric elements are provided every respective detection elements. Namely, in the sensor shown in FIGS. 1 and 2, common piezoelectric element 21 was used for detection elements D1 and D2, common piezoelectric element 23 was used for the detection element D3 and D4, common piezoelectric element 22 was used for the detection elements D5 and D6, and common piezoelectric element 24 was used for detection element D7 and D8. On the contrary, in the sensor shown in FIGS. 14 and 15, eight piezoelectric elements 21a, 21b, 22a, 22b; 23a, 23b, 24a and 24b are provided so that respective detection elements D1-D8 are constituted by physically completely independent parts.

Figure 16:
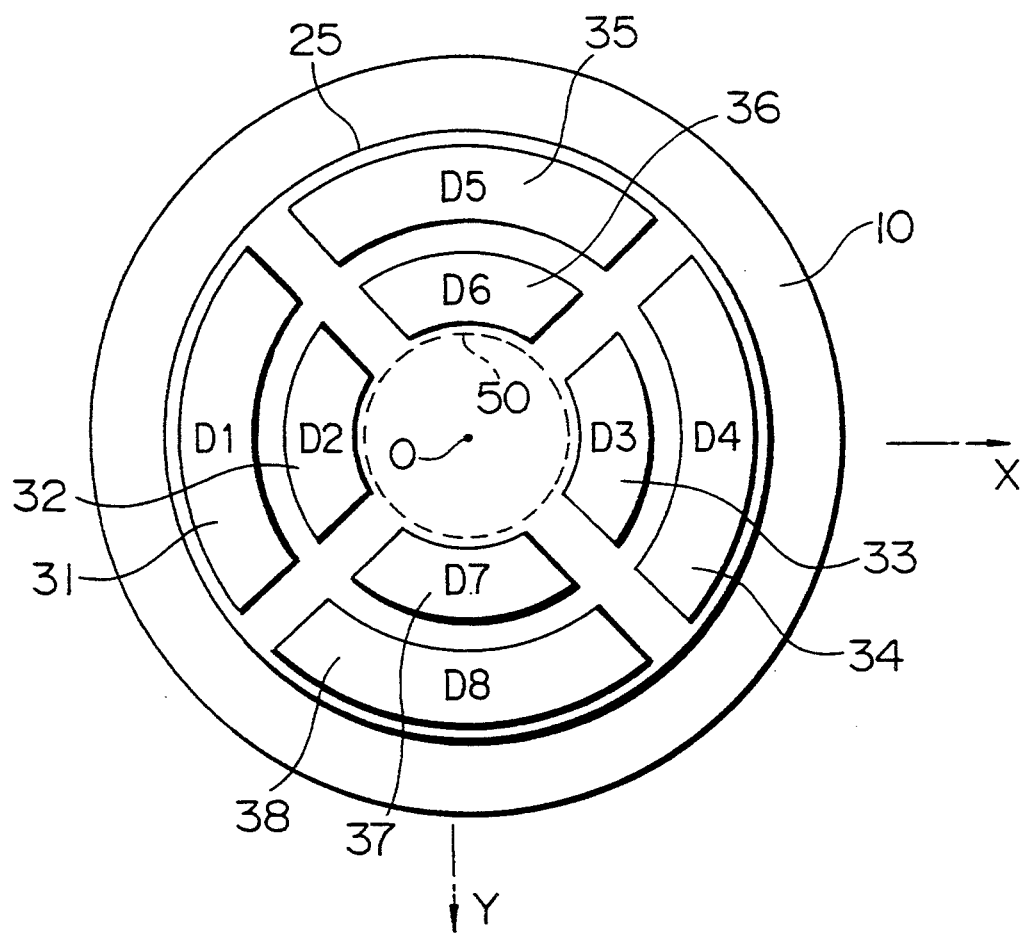
FIG. 16 is a top view showing an embodiment of an acceleration sensor constituted with only one disk-shaped piezoelectric element.

In this invention, if electrodes of respective detection elements are independent with resact to electrodes of other detection elements, it is sufficient from a theoretical point of view that the piezoelectric elements are common to respective detection elements. In an extreme example, as shown in FIG. 16, only one large disk-shaped piezoelectric element may be prepared to constitute eight sets of detection elements in a manner to commonly use this one piezoelectric element. It should be noted that since recombination of charges takes place within the piezoelectric element in a practical sense, it is preferable to use piezoelectric elements which are independent every respective detection elements as in the embodiment shown in FIGS. 14 and 15 in order to strictly measure vibration of a low frequency. However, the manufacturing process becomes complicated accordingly.

Figure 17:
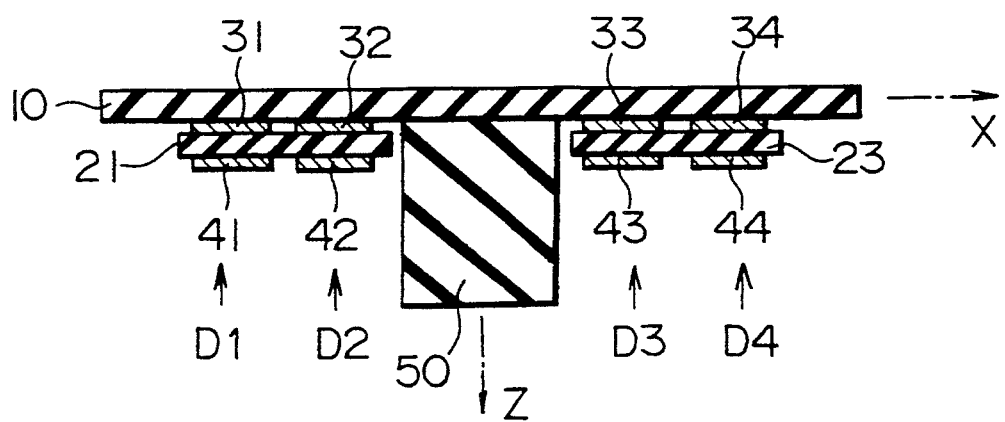
FIG. 17 is a side cross sectional view of an acceleration sensor according to a further embodiment of this invention wherein only a cross sectional portion is shown.

FIG. 17 is a side cross sectional view showing a further structure of an acceleration sensor according to this invention. Also in this cross sectional view, only the cross section is indicated in order to avoid that the figure becomes complicated. While detection elements are arranged on the upper surface of the substrate 10 in the previously described respective embodiments, detection elements are arranged on the lower surface of the substrate 10 in this embodiment. In short, in the sensor according to this invention, if four detection elements D1-D4 can be arranged along the X-axis and four detection elements D5-D8 can be arranged along the Y-axis, it dose not matter whether those detection elements are arranged on the upper surface or the lower surface of the substrate 10. Further, there may be a configuration such that various detection elements are arranged on the upper and the lower surfaces at random, or a configuration such that they are arranged on the upper and the lower surfaces. It should be noted that it is necessary to allow wirings between electrodes to be proper in consideration of polarity of charges produced on respective electrodes in order to carry out a correct detection.

Figure 18:
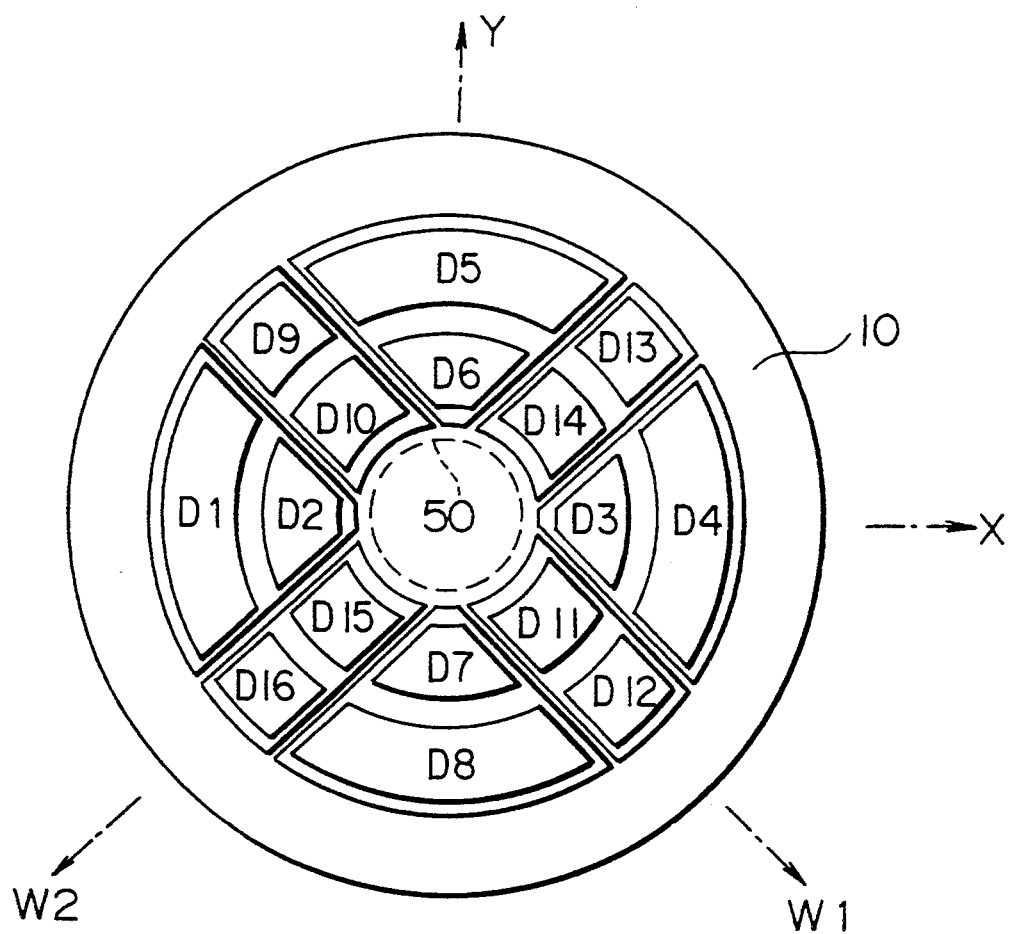
FIG. 18 is a top view of an acceleration sensor according to an embodiment of this invention using sixteen sets of detection elements.

While, in the above-described embodiment, eight sets of detection elements are used to detect components in respective three-dimensional axial directions, a larger number of detection elements may be used to carry out similar detection. An embodiment where its top view is shown in FIG. 18 is the example where sixteen sets of detection elements D1-D16 are used. In this embodiment, the detection elements D1-D8 shown in FIG. 18 are identical to the detection elements D1-D8 shown in FIG. 1 (the area is caused to be slightly smaller). The detection elements D1-D4 and the detection elements D5-D8 are arranged along the X-axis and along the Y-axis, respectively. In this embodiment, on the XY-plane, a W1 axis having an angle of 45 degrees relative to the X-axis and a W2 axis having 135 degrees relative to the X-axis are further defined. Thus, detection elements D9-D12 and detection elements D13-D16 are arranged along the W1 axis and along the W2 axis, respectively.

When such arrangement is carried out, it is possible to detect a force in the X-axis direction by the detection elements D1-D4, to detect a force in the Y-axis direction by the detection elements D5-D8, and to detect a force in the Z-axis direction by the detection elements D9–D12 or D13–D16, or the detection elements D9–D16. Accordingly, detection of force components in the X, Y and Z axis directions can be carried out by completely independent separate detection elements. It is true, but detection can be made even with detection elements arranged along any axis in parallel to the substrate surface with respect to the Z-axis direction perpendicular to the surface of the substrate 10. Namely, if any sets of detection elements D1–D4 arranged along the X-axis, detection elements D5–D8 arranged along the Y-axis, detection elements D9–D12 arranged along the W1 axis, and detection elements D13–D16 arranged along the W2 axis are used, detection of a forcd in the Z-axis direction can be made. Additionally, the piezoelectric element used here may be constituted with a single substrate 25 as shown in FIG. 16.

Figure 19:
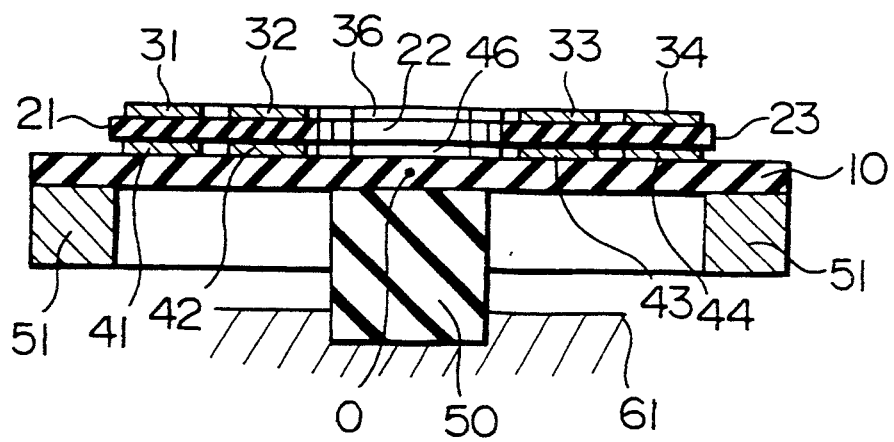
FIG. 19 is a side cross sectional view of an acceleration sensor according to an embodiment of this invention where an inside of a substrate is fixed.

While, all in the above-described embodiments, the peripheral portion at the outside of the substrate 10 is fixed to the sensor casing, and working body 50 is formed in the vicinity of the origin O at the inside of the substrate 10, the relationship between the inside and the outside of the substrate may be completely reversed. Namely, as in an embodiment where its cross sectional view is shown in FIG. 19, there may be employed a configuration such that a working body 50 (in this example, the function as a working body is lost, so this working body is used as a mere pedestal) in the vicinity of the origin O at the inside of the substrate 10 is fixed on a sensor casing 61, and that a working body 51 is newly formed at the peripheral portion outside the substrate 10. In this embodiment, the working body 51 is a ring-shaped weight body attached along the outer periphery of the disk-shaped substrate 10. In such a configuration, the inside of the substrate 10 is fixed so that a force is exerted toward the outside. However, this embodiment does not differ from the previously described embodiments in that bending is produced in the substrate 10 on the basis of a force exerted. Accordingly, the structure in which the relationship between the inside and the outside of the substrate is reversed as described above may be applied to all the previously described embodiments.

Other Embodiments of the Detection Circuit

Figure 20:
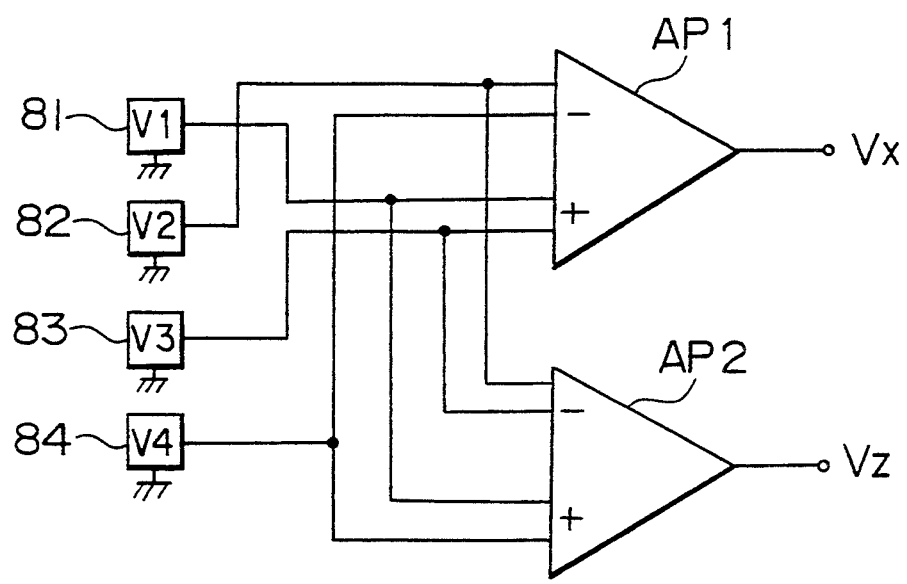
FIG. 20 is a circuit diagram showing another detection circuit used in the acceleration sensor shown in FIG. 1.
Figure 20:
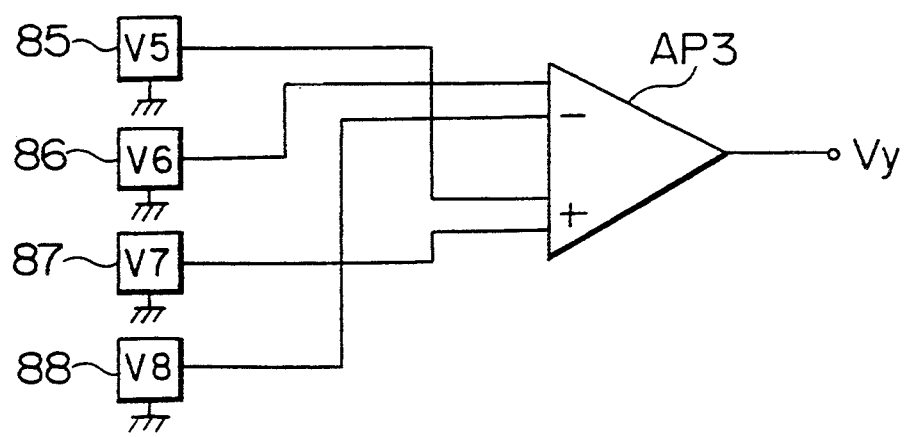

Let now consider in more detail the meaning that the circuits shown in FIGS. 5a and 5b have. Consideration is made in connection with the case where charges produced on the basis of a force are converted to potentials with consideration of signs. Namely, a potential of a first electrode relating to a second electrode which is fixed on the substrate (one of lower electrodes 41–48 in the example of FIG. 1) is defined as a potential in this detection element. In other words, assming that electrodes fixed on the substrate are grounded, a voltage value appearing on each other electrode indicates a potential in that detection element. When reference is made to the circuit shown in FIGS. 5a and 5b, it is seen that, with respect to the detection elements D1 and D3, electrodes 41, 43 fixed on the substrate are connected to the Ax side; and with respect to the detection elements D2 and D4, electrodes 42, 44 fixed on the substrate are connected to the terminal Bx side. Namely, the detection elements D1, D3 and the detection elements D2, D4 are connected in directions opposite to each other. Eventually, it is seen that a difference between a sum of a potential on the detection element D1 and a potential on the detection element D3 and a sum of a potential on the detection element D2 and a potential on the detection element D4 is a voltage Vx appearing across the terminals Ax and Bx. Namely, if potentials obtained by the detection elements D1, D2, D3 and D4 are respectively represented by V1, V2, V3 and V4, the voltage Vx is expressed as Vx=(V1+V3)−(V2+V4). Accordingly, if voltage detectors for detecting these voltages V1, V2, V3 and V4 are provided as shown in FIG. 20, a voltage Vx can be obtained as an output of a differential amplifier AP1.

When reference is made to the circuit shown in FIGS. 7a and 7b, it is seen that, with respect to the detection elements D5, D7, electrodes 45 and 47 fixed on the substrate are connected to the terminal Ay side, and that, with respect to detection elements D6 and D8, electrodes 46, 48 fixed on the substrate are connected to the terminal By side. Namely, the detection elements D5, D7 and the detection elements D6, D8 are connected in directions opposite to each other. Eventually, it is seen that a difference between a sum of a potential on the detection element D5 and a potential on the detection element D7 and a sum of a potential on the detection element D6 and a potential on the detection elemnt D8 is a voltage Vy appearing across the terminals Ay and By. Namely, when potentials on the detection elements D5, D6, D7 and D8 are respectively represented by V5, V6, V7 and V8, the voltage Vy is expressed as Vy=(V5+V7)−(V6+V8). Accordingly, if voltage detectors 85, 86, 87 and 88 for detecting these voltages V5, V6, V7 and V8 are provided as shown in FIG. 20, a voltage Vy can be obtained as an output of a differential amplifier AP3.

Further, when reference is made to the circuit shown in FIGS. 9a and 9b, it is seen that, with respect to detection elements D1 and D4, electrodes 41, 44 fixed on the substrate are connected to the terminal Az side, and that, with respect to detection elements D2 and D3, electrodes 42, 43 fixed on the substrate are connected to the terminal Bz side. Namely, the detection elements D1, D4 and the detection elements D2, D3 are connected in directions opposite to each other. Eventually, it is seen that a difference between a sum of a potential on the detection element D1 and a potential on the detection element D4 and a sum of a potential on the detection element D2 and a potential on the detection element D3 is a voltage Vz appearing across the terminals Az and Bz. Namely, if potentials on the detection elements D1, D2, D3 and D4 are respectively represented by V1, V2, V3 and V4, the voltage Vz is expressed as Vz=(V1+V4)−(V2+V3). Accordingly, the voltage detectors 81, 82, 83 and 84 are used, thereby making it possible to obtain a voltage Vz as an output of the differential amplifier AP2.

Figure 21:
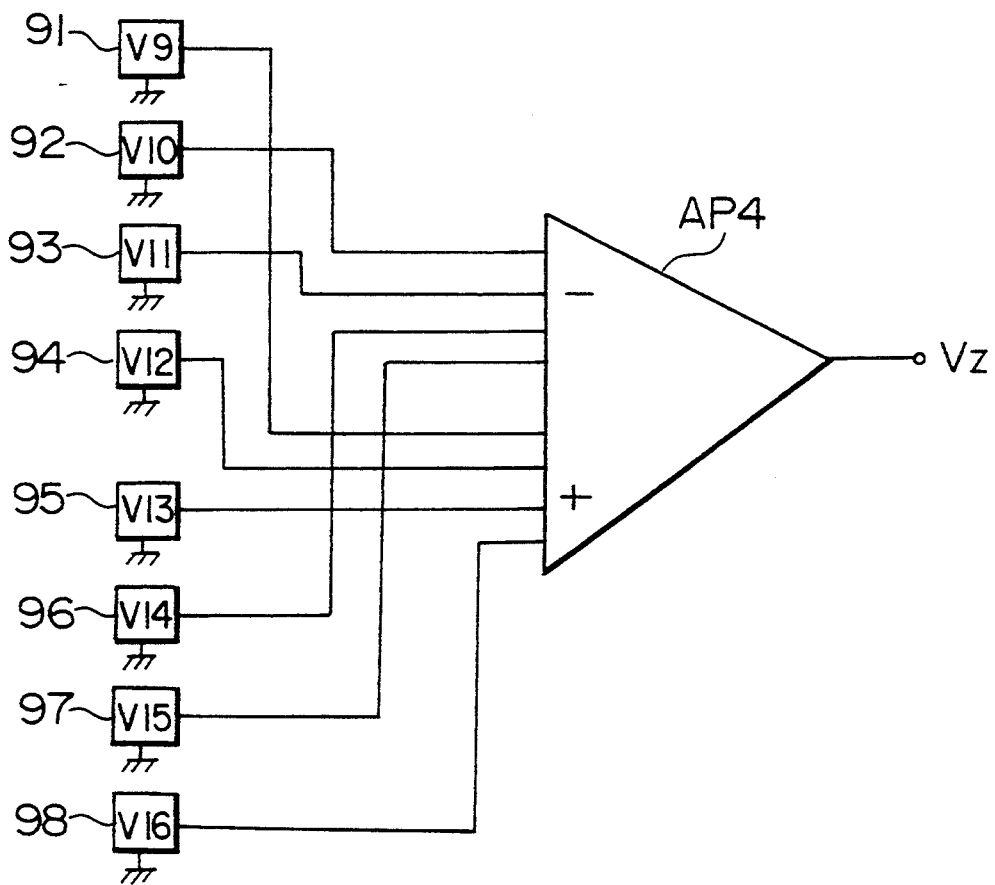
FIG. 21 is a circuit diagram showing a detection circuit with respect to the Z-axis direction used in the acceleration sensor shown in FIG. 15.

Further, in a sensor using sixteen sets of detection elements shown in FIG. 18, with respect to the voltage Vz, detection can be made by a circuit shown in FIG. 21. Namely, an approach is employed to detect potentials V9–V16 on the detection elements D9–D16 by voltage detectors 91–98, thereby making it possible to obtain a voltage Vz as an output of a differential amplifier AP4. In this case, the differential amplifier AP2 shown in FIG. 20 becomes unnecessary, and components in X, Y and Z axis directions can be detected by completely separate independent circuits. While all the potentials V9–V12 are used in the circuit shown in FIG. 21, only four potentials V9–V12 or only four potentials V13–V16 may be used. It should be noted that all potentials V9–V16 are used for carrying out high accuracy measurement.

Still Further Embodiments

While this invention has been described in accordance with various embodiments, this invention should not be limited to these embodiments, and therefore may be carried out in various modes in addition to the above-mentioned embodiments. While, in the above-described embodiments, for example, detection of acceleration components in three-dimensional axis directions by using eight sets or sixteen sets of detection elements, detection of acceleration components in two-dimensional directions may be carried out by using only four sets of detection elements. For example, by using only the detection elements D1–D4, detection of a component in the X-axis direction and a component in the Z-axis direction can be carried out.

Further, while the above-described embodiments are all directed to the example where this invention is applied to an acceleration sensor, this invention is applicable to a sensor for force or magnetism. For example, when the sensor of this invention is used as a force sensor, there may be employed a configuration such that a contact is extended from working body 50 to transmit an external force to substrate 10 by this contact. In addition, in the case where the sensor of this invention is used as a sensor for magnetism, if the working body 50 is constituted with a magnetic body such as iron, cobalt or nickel, etc. a force produced by action of magnetism is detected, thereby making it possible to indirectly detect magnetism.

As stated above, in accordance with the sensor according to this invention, there are prepared plural sets of detection elements each comprised of a plate-shaped piezoelectric element and a pair of electrodes formed on both the surfaces of this piezoelectric element to dispose such sets of detection elements at a predetermined position on a flexible substrate to detect force, acceleration or magnetism exerted thereon on the basis of voltage values produced across respective electrodes. Thus, high accuracy detection can be made without temperature compensation, and the manufacturing process becomes easy.

INDUSTRIAL APPLICABILITY

A sensor using a piezoelectric element according to this invention can be utilized as a sensor for force, acceleration or magnetism. In addition, this sensor can detect these physical quantitites every respective components in three-dimensional directions. Accordingly, when mounted in an automotive vehicle or an industrial robot, this sensor can be widely utilized for carrying out pressure detection, acceleration detection or magnetism detection of respective parts. Particularly, if this sensor is used as an acceleration sensor adapted to be mounted in an automotive vehicle, it is possible to precisely detect an impact at the time of head-on collision or side collision every respective components in axial directions. Thus, this sensor can be utilized as an air-bag system.

I claim:

1. A force sensor comprising: a substrate (10) having a planar surface; a working body (50); a sensor casing (60); four detection elements (D1, D2, D3, D4) on said planar surface of said substrate, each two of said detection elements comprising a piezoelectric element (21, 23) in plate form; at least two first electrodes (31, 32, 33, 34) on a first surface of each of said piezoelectric elements; at least two second electrodes (41, 42, 43, 44) on an opposite second surface of each of said piezoelectric elements between said piezoelectric elements and said substrate; and a first detection terminal (Ax) and a second detection terminal (Bx), wherein an origin (O) is defined at a point within said substrate (10) and an X-axis is defined so that it passes through said origin and extends in a direction parallel to said surface of said substrate, said four detection elements being arranged along said X-axis in such a manner that one of said two of said detection elements (D3, D4) is located on one side of said origin and another of said two of said detection elements (D1, D2) is located on an opposite side of said origin, wherein a peripheral portion of said substrate is fixed to said sensor casing (60), wherein said working body (50) is fixed to said substrate so as to transmit a force applied to said working body to said origin, wherein said substrate is flexible to said force, whereby a first four of said electrodes (41, 32, 43, 34) among said first and second electrodes provide charges of a first polarity when an X-axis component of said force is applied to said working body, wherein said first four electrodes are connected to said first detection terminal (Ax), whereby a second four of said electrodes (31, 42, 33, 44) among said first and second electrodes produce charges of a second polarity when said X-axis component of said force is applied to said working body, and wherein said second four electrodes are connected to said second detection terminal (Bx), whereby to sense said X-axis component of said force applied to said working body on the basis of a potential difference between said first detection terminal and said second detection terminal.

2. A force sensor as set forth in claim 1, wherein a piezoelectric element (25) comprised of a single substrate is used commonly to a plurality of detection elements (D1–D12).

3. A sensor as set forth in claim 1, wherein a working body is caused to produce a force on the basis of an acceleration applied from the external, thereby permitting detection of acceleration.

4. A sensor as set forth in claim 1, wherein a working body is constituted with a magnetic material to allow said working body to produce a force on the basis of magnetism applied from the external, thereby permitting detection of magnetism.

5. A force sensor comprising: a substrate (10) having a planar surface; a working body (51); a sensor casing (61); four detection elements (D1, D2, D3, D4) on said planar surface of said substrate, each two of said detection elements comprising a piezoelectric element (21, 23) in plate form; at least two first electrodes (31, 32, 33, 34) on a first surface of each of said piezoelectric elements; at least two second electrodes (41, 42, 43, 44) on an opposite second surface of each of said piezoelectric elements between said piezoelectric elements and said substrate; and a first detection terminal (Ax) and a second detection terminal (Bx), wherein an origin (O) is defined at a point within said substrate (10) and an X-axis is defined so that it passes through said origin and extends in a direction parallel to said surface of said substrate, said four detection elements being arranged along said X-axis in such a manner that one of said two of said detection elements (D3, D4) is located on one side of said origin and another of said two of said detection elements (D1, D2) is located on an opposite side of said origin, wherein a portion of said substrate at said origin is fixed to said sensor casing (61), wherein said working body (51) is fixed to a peripheral portion of said substrate so as to transmit a force applied to said working body to said peripheral portion of said substrate, wherein said substrate is flexible to said force, whereby a first four of said electrodes (41, 32, 43, 34) among said first and second electrodes produce charges of a first polarity when an X-axis component of said force is applied to said working body, wherein said first four electrodes are connected to said first detection terminal (Ax), whereby a second four of said electrodes (31, 42, 33, 44) among said first and second electrodes produce charges of a second polarity when said X-axis component of said force is applied to said working body, and wherein said second four electrodes are connected to said second detection terminal (Bx), whereby to sense said X-axis component of said force applied to said working body on the basis of a potential difference between said first detection terminal and said second detection terminal.

6. A force sensor comprising a substrate (10), a working body (50), a sensor casing (60) and four detection elements (D1, D2, D3, D4), each of said detection elements comprising a piezoelectric element (21, 23) in a plate form, a first electrode (31, 32, 33, 34) formed on a first surface of said piezoelectric element, and a second electrode (41, 42, 43, 44) formed on a second surface of said piezoelectric element, wherein an origin (O) is defined at a point within said substrate (10), an X-axis is defined so that it passes through said origin and extends in a direction parallel to a substrate surface of said substrate, a Z-axis is defined so that it passes through said origin and extends in a direction perpendicular to said substrate surface, and an inside area including said origin and an outside area surrounding said inside area are defined on said substrate surface, said four detection elements being arranged along said X-axis in such a manner that a first detection element (D1) is in a negative region of said X-axis in said outside area, a second detection element (D2) is in the negative region of said X-axis in said inside area, a third detection element (D3) is in a positive region of said X-axis in said inside area, and a fourth detection element (D4) is in the positive region of said X-axis in said outside area, and the respective second electrodes (41, 42, 43, 44) of said respective detection elements are fixed on said substrate, wherein a peripheral portion of said substrate is fixed to said sensor casing (60), wherein said working body (50) is fixed to said substrate so as to transmit a force applied to said working body to said origin, wherein said substrate having enough flexibility to transmit a force applied to said working body to said detection elements, and wherein potentials of said first electrodes (31, 32, 33, 34) with respect to said second electrodes (41, 42, 43, 44) fixed on said substrate in said respective detection elements are obtained, to detect a force in said X-axis direction applied to said working body on the basis of a difference between a sum of a potential on said first detection element and a potential on said third detection element and a sum of a potential on said second detection element and a potential on said fourth detection element, and to detect a force in said Z-axis direction applied to said working body on the basis of a difference between a sum of a potential on said first detection element and a potential on said fourth detection element and a sum of a potential on said second detection element and a potential on said third detection element.

7. A force sensor comprising a substrate (10), a working body (51), a sensor casing (61) and four detection elements (D1, D2, D3, D4), each of said detection elements comprising a piezoelectric element (21, 23) in a plate form, a first electrode (31, 32, 33, 34) formed on a first surface of said piezoelectric element, and a second electrode (41, 42, 43, 44) formed on a second surface of said piezoelectric element, wherein an origin (O) is defined at a point within said substrate (10), an X-axis is defined so that it passes through said origin and extends in a direction parallel to a substrate surface of said substrate, a Z-axis is defined so that it passes through said origin and extends in a direction perpendicular to said substrate surface, and an inside area including said origin and an outside area surrounding said inside area are defined on said substrate surface, said four detection elements being arranged along said X-axis in such a manner that a first detection element (D1) is in a negative region of said X-axis in said outside area, a second detection element (D2) is in the negative region of said X-axis in said inside area, a third detection element (D3) is in a positive region of said X-axis in said inside area, and a fourth detection element (D4) is in the positive region of said X-axis in said outside area, and the respective second electrodes (41, 42, 43, 44) of said respective detection elements are fixed on said substrate, wherein a portion in a vicinity of said origin of said substrate is fixed to said sensor casing (61), wherein said working body (51) is fixed to said substrate so as to transmit a force applied to said working body to a peripheral portion of said substrate, wherein said substrate having enough flexibility to transmit a force applied to said working body to said detection elements, and wherein potentials of said first electrodes (31, 32, 33, 34) with respect to said second electrodes (41, 42, 43, 44) fixed on said substrate in said respective detection elements are obtained, to detect a force in said X-axis direction applied to said working body on the basis of a difference between a sum of a potential on said first detection element and a potential on said third detection element and a sum of a potential on said second detection element and a potential on said fourth detection element, and to detect a force in said Z-axis direction applied to said working body on the basis of a difference between a sum of a potential on said first detection element and a potential on said fourth detection element and a sum of a potential on said second detection element and a potential on said third detection element.

8. A force sensor comprising a substrate (10), a working body (50), a sensor casing (60) and eight detection elements (D1–D8), each of said detection elements comprising a piezoelectric element (21–24) in a plate form, a first electrode (31–38) formed on a first surface of said piezoelectric element, and a second electrode (41–48) formed on a second surface of said piezoelectric element, wherein an origin (O) is defined at a point within said substrate (10), an X-axis is defined so that it passes through said origin and extends in a direction parallel to a substrate surface of said substrate, a Y-axis is defined so that it is perpendicular to said X-axis at said origin and it extends in a direction parallel to said substrate surface, and an inside area including said origin and an outside area surrounding said inside area are defined on said substrate surface, wherein first, second, third and fourth detection elements (D1–D4) of said eight detection elements are respectively arranged along said X-axis in such a manner that said first detection element (D1) is in a negative region of said X-axis in said outside area, said second detection element (D2) is in the negative region of said X-axis in said inside area, said third detection element (D3) is in a positive region of said X-axis in said inside area, and said fourth detection element (D4) is in the positive region of the X-axis in said outside area, and the respective second electrodes (41–44) of said first to fourth detection elements are fixed on said substrate, wherein fifth, sixth, seventh and eighth detection elements (D5–D8) of said eight detection elements are respectively arranged along said Y-axis in such a manner that said fifth detection element (D5) is in a negative region of said Y-axis in said outside area, said sixth detection element (D6) is in the negative region of said Y-axis in said inside area, said seventh detection element (D7) is in a positive region of said Y-axis in said inside area, and said eighth detection element (D8) is in the positive region of said Y-axis in said outside area, and the respective second electrodes (45–48) of said fifth to eighth detection elements are fixed on said substrate, wherein a peripheral portion of said substrate is fixed to said sensor casing (60), wherein said working body (50) is fixed to said substrate so as to transmit a force applied to said working body to said origin, wherein said substrate having enough flexibility to transmit a force applied to said working body to said detection elements, and wherein potentials of said first electrodes (31–38) with respect to said second electrodes (41–48) fixed on said substrate in said respective detection elements are obtained, to detect a force in said X-axis direction applied to said working body on the basis of a difference between a sum of a potential on said first detection element and a potential on said third detection element and a sum of a potential on said second detection element and a potential on said fourth detection element, and to detect a force in said Y-axis direction applied to said working body on the basis of a difference between a sum of a potential on said fifth detection element and a potential on said seventh detection element and a sum of a potential on said sixth detection element and a potential on said eighth detection element.

9. A force sensor comprising a substrate (10), a working body (51), a sensor casing (61) and eight detection elements (D1–D8), each of said detection elements comprising a piezoelectric element (21–24) in a plate form, a first electrode (31–38) formed on a first surface of said piezoelectric element, and a second electrode (41–48) formed on a second surface of said piezoelectric element, wherein an origin (O) is defined at a point within said substrate (10), an X-axis is defined so that it passes through said origin and extends in a direction parallel to a substrate surface of said substrate, a Y-axis is defined so that it is perpendicular to said X-axis at said origin and it extends in a direction parallel to said substrate surface, and an inside area including said origin and an outside area surrounding said inside area are defined on said substrate surface, wherein first, second, third and fourth detection elements (D1–D4) of said eight detection elements are respectively arranged along said X-axis in such a manner that said first detection element (D1) is in a negative region of said X-axis in said outside area, said second detection element (D2) is in the negative region of said X-axis in said inside area, said third detection element (D3) is in a positive region of said X-axis in said inside area, and said fourth detection element (D4) is in the positive region of the X-axis in said outside area, and the respective second electrodes (41–44) of said first to fourth detection elements are fixed on said substrate, wherein fifth, sixth, seventh and eighth detection elements (D5–D8) of said eight detection elements are respectively arranged along said Y-axis in such a manner that said fifth detection element (D5) is in a negative region of said Y-axis in said outside area, said sixth detection element (D6) is in the negative region of said Y-axis in said inside area, said seventh detection element (D7) is in a positive region of said Y-axis in said inside area, and said eighth detection element (D8) is in the positive region of said Y-axis in said outside area, and the respective second electrodes (45–48) of said fifth to eighth detection elements are fixed on said substrate, wherein a portion in a vicinity of said origin of said substrate is fixed to said sensor casing (61), wherein said working body (51) is fixed to said substrate so as to transmit a force applied to said working body to a peripheral portion of said substrate, wherein said substrate having enough flexibility to transmit a force applied to said working body to said detection elements, and wherein potentials of said first electrodes (31–38) with respect to said second electrodes (41–48) fixed on said substrate in said respective detection elements are obtained, to detect a force in said X-axis direction applied to said working body on the basis of a difference between a sum of a potential on said first detection element and a potential on said third detection element and a sum of a potential on said second detection element and a potential on said fourth detection element, and to detect a force in said Y-axis direction applied to said working body on the basis of a difference between a sum of a potential on said fifth detection element and a potential on said seventh detection element and a sum of a potential on said sixth detection element and a potential on said eighth detection element.

10. A force sensor comprising a substrate (10), a working body (50), a sensor casing (60) and twelve detection elements (D1–D12), each of said detection elements comprising a piezoelectric element in a plate form, a first electrode formed on a first surface of said piezoelectric element, and a second electrode formed on a second surface of said piezoelectric element, wherein an origin (O) is defined at a point within said substrate (10), an X-axis is defined so that it passes through said origin and extends in a direction parallel to a substrate surface of said substrate, a Y-axis is defined so that it is perpendicular to said X-axis at said origin and it extends in a direction parallel to said substrate surface, a Z-axis is defined so that it passes through said origin and extends in a direction perpendicular to said substrate surface, a W-axis is defined so that it intersects with said respective axes of X, Y and Z at said origin and extends in a direction parallel to said substrate surface, and an inside area including said origin and an outside area surrounding said inside area are defined on said substrate surface, wherein first, second, third and fourth detection elements (D1–D4) of said twelve detection elements are respectively arranged along said X-axis in such a manner that said first detection element (D1) is in a negative region of said X-axis in said outside area, said second detection element (D2) is in the negative region of said X-axis in said inside area, said third detection element (D3) is in a positive region of said X-axis in said inside area, and said fourth detection element (D4) is in the positive region of said X-axis in side outside area, and the respective second electrodes of said first to fourth detection elements are fixed on said substrate, wherein fifth, sixth, seventh and eighth detection elements (D5–D8) of said twelve sets of detection elements are respectively arranged along said Y-axis in such a manner that said fifth detection element (D5) is in a negative region of said Y-axis in said outside area, said sixth detection element (D6) is in the negative region of said Y-axis in said inside area, said seventh detection element (D7) is in a positive region of said Y-axis in said inside area, and said eighth detection element (D8) is in the positive region of said Y-axis in said outside area, and the respective second electrodes of said fifth to eighth detection elements are fixed on said substrate, wherein ninth, tenth, eleventh and twelfth detection elements (D9–D12) of said twelve detection elements are respectively arranged along said W-axis in such a manner that said ninth detection element (D9) is in a negative region of said W-axis in said outside area, said tenth detection element (D10) is in the negative region of said W-axis in said inside area, said eleventh detection element (D11) is in a positive region of said W-axis in said inside area, and a twelfth detection element (D12) is in the positive region of said W-axis in said outside area, and the respective second electrodes of said ninth to twelfth detection elements are fixed on said substrate, wherein a peripheral portion of said substrate is fixed to said sensor casing (60), wherein said working body (50) is fixed to said substrate so as to transmit a force applied to said working body to said origin, wherein said substrate having enough flexibility to transmit a force applied to said working body to said detection elements, and wherein potentials of said first electrodes with respect to said second electrodes fixed on said substrate in said respective detection elements are obtained, to detect a force in said X-axis direction applied to said working body on the basis of a difference between a sum of a potential on said first detection element and a potential on said third detection element and a sum of a potential on said second detection element and a potential on said fourth detection element, to detect a force in said Y-axis direction applied to said working body on the basis of a difference between a sum of a potential on said fifth detection element and a potential on said seventh detection element and a sum of a potential on said sixth detection element and a potential on said eighth detection element, and to detect a force in said Z-axis direction applied to said working body on the basis of a difference between a sum of a potential on said ninth detection element and a potential on said twelve detection element and a sum of a potential on said tenth detection element and a potential on said eleventh detection element.

11. A force sensor comprising a substrate (10), a working body (51), a sensor casing (61) and twelve detection elements (D1–D12), each of said detection elements comprising a piezoelectric element in a plate form, a first electrode formed on a first surface of said piezoelectric element, and a second electrode formed on a second surface of said piezoelectric element, wherein an origin (O) is defined at a point within said substrate (10), an X-axis is defined so that it passes through said origin and extends in a direction parallel to a substrate surface of said substrate, a Y-axis is defined so that it is perpendicular to said X-axis at said origin and it extends in a direction parallel to said substrate surface, a Z-axis is defined so that it passes through said origin and extends in a direction perpendicular to said substrate surface, a W-axis is defined so that it intersects with said respective axes of X, Y and Z at said origin and extends in a direction parallel to said substrate surface, and an inside area including said origin and an outside area surrounding said inside area are defined on said substrate surface, wherein first, second, third and fourth detection elements (D1–D4) of said twelve detection elements are respectively arranged along said X-axis in such a manner that said first detection element (D1) is in a negative region of said X-axis in said outside area, said second detection element (D2) is in the negative region of said X-axis in said inside area, said third detection element (D3) is in a positive region of said X-axis in said inside area, and said fourth detection element (D4) is in the positive region of said X-axis in side outside area, and the respective second electrodes of said first to fourth detection elements are fixed on said substrate, wherein fifth, sixth, seventh and eighth detection elements (D5-D8) of said twelve sets of detection elements are respectively arranged along said Y-axis in such a manner that said fifth detection element (D5) is in a negative region of said Y-axis in said outside area, said sixth detection element (D6) is in the negative region of said Y-axis in said inside area, said seventh detection element (D7) is in a positive region of said Y-axis in said inside area, and said eighth detection element (D8) is in the positive region of said Y-axis in said outside area, and the respective second electrodes of said fifth to eighth detection elements are fixed on said substrate, wherein ninth, tenth, eleventh and twelfth detection elements (D9-D12) of said twelve detection elements are respectively arranged along said W-axis in such a manner that said ninth detection element (D9) is in a negative region of said W-axis in said outside area, said tenth detection element (D10) is in the negative region of said W-axis in said inside area, said eleventh detection element (D11) is in a positive region of said W-axis in said inside area, and a twelfth detection element (D12) is in the positive region of said W-axis in said outside area, and the respective second electrodes of said ninth to twelfth detection elements are fixed on said substrate, wherein a portion in a vicinity of said origin of said substrate is fixed to said sensor casing (61), wherein said working body (51) is fixed to said substrate so as to transmit a force applied to said working body to a peripheral portion of said substrate, wherein said substrate having enough flexibility to transmit a force applied to said working body to said detection elements, and wherein potentials of said first electrodes with respect to said second electrodes fixed on said substrate in said respective detection elements are obtained, to detect a force in said X-axis direction applied to said working body on the basis of a difference between a sum of a potential on said first detection element and a potential on said third detection element and a sum of a potential on said second detection element and a potential on said fourth detection element, to detect a force in said Y-axis direction applied to said working body on the basis of a difference between a sum of a potential on said fifth detection element and a potential on said seventh detection element and a sum of a potential on said sixth detection element and a potential on said eighth detection element, and to detect a force in said Z-axis direction applied to said working body on the basis of a difference between a sum of a potential on said ninth detection element and a potential on said twelve detection element and a sum of a potential on said tenth detection element and a potential on said eleventh detection element.

12. A force sensor comprising a substrate (10), a working body (50), a sensor casing (60) and four detection elements (D1, D2, D3, D4), each of said detection elements comprising a piezoelectric element (21, 23) in a plate form, a first electrode (31, 32, 33, 34) formed on a first surface of said piezoelectric element, and a second electrode (41, 42, 43, 44) formed on a second surface of said piezoelectric element, wherein an origin (O) is defined at a point within said substrate (10), an X-axis is defined so that it passes through said origin and extends in a direction parallel to a substrate surface of said substrate, a Z-axis is defined so that it passes through said origin and extends in a direction perpendicular to said substrate surface, and an inside area including said origin and an outside area surrounding said inside area are defined on said substrate surface, said four detection elements being arranged along said X-axis in such a manner that a first detection element (D1) is in a negative region of said X-axis in said outside area, a second detection element (D2) is in the negative region of said X-axis in said inside area, a third detection element (D3) is in a positive region of said X-axis in said inside area, and a fourth detection element (D4) is in the positive region of said X-axis in said outside area, and the respective second electrodes (41, 42, 43, 44) of said respective detection elements are fixed on said substrate, wherein a peripheral portion of said substrate is fixed to said sensor casing (60), wherein said working body (50) is fixed to said substrate so as to transmit a force applied to said working body to said origin, wherein said substrate having enough flexibility to transmit a force applied to said working body to said detection elements, and said force sensor further comprising a first detection terminal (Ax), a second detection terminal (Bx), a third detection terminal (Az) and a fourth detection terminal (Bz), wherein four electrodes (41, 32, 43, 34) among said first and second electrodes, on which charges of a first polarity are produced when an X-axis component of force is applied to said working body, are connectable to said first detection terminal (Ax), wherein four electrodes (31, 42, 33, 44) among said first and second electrodes, on which charges of a second polarity are produced when an X-axis component of force is applied to said working body, are connectable to said second detection terminal (Bx), wherein four electrodes (41, 32, 33, 44) among said first and second electrodes, on which charges of the first polarity are produced when an Z-axis component of force is applied to said working body, are connectable to said third detection terminal (Az), wherein four electrodes (31, 42, 43, 34) among said first and second electrodes, on which charges of the second polarity are produced when an Z-axis component of force is applied to said working body, are connectable to said fourth detection terminal (Bz), to detect said X-axis component of force applied to said working body on the basis of a potential difference (Vx) across said first and second detection terminals, and to detect said Z-axis component of force applied to said working body on the basis of a potential difference (Vz) across said third and fourth detection terminals.

13. A force sensor comprising a substrate (10), a working body (51), a sensor casing (61) and four detection elements (D1, D2, D3, D4), each of said detection elements comprising a piezoelectric element (21, 23) in a plate form, a first electrode (31, 32, 33, 34) formed on a first surface of said piezoelectric element, and a second electrode (41, 42, 43, 44) formed on a second surface of said piezoelectric element, wherein an origin (O) is defined at a point within said substrate (10), an X-axis is defined so that it passes through said origin and extends in a direction parallel to a substrate surface of said substrate, a Z-axis is defined so that it passes through said origin and extends in a direction perpendicular to said substrate surface, and an inside area including said origin and an outside area surrounding said inside area are defined on said substrate surface, said four detection elements being arranged along said X-axis in such a manner that a first detection element (D1) is in a negative region of said X-axis in said outside area, a second detection element (D2) is in the negative region of said X-axis in said inside area, a third detection element (D3) is in a positive region of said X-axis in said inside area, and a fourth detection element (D4) is in the positive region of said X-axis in said outside area, and the respective second electrodes (41, 42, 43, 44) of said respective detection elements are fixed on said substrate, wherein a portion in a vicinity of said origin of said substrate is fixed to said sensor casing (61), wherein said working body (51) is fixed to said substrate so as to transmit a force applied to said working body to a peripheral portion of said substrate, wherein said substrate having enough flexibility to transmit a force applied to said working body to said detection elements, and said force sensor further comprising a first detection terminal (Ax), a second detection terminal (Bx), a third detection terminal (Az) and a fourth detection terminal (Bz), wherein four electrodes (41, 32, 43, 34) among said first and second electrodes, on which charges of a first polarity are produced when an X-axis component of force is applied to said working body, are connectable to said first detection terminal (Ax), wherein four electrodes (31, 42, 33, 44) among said first and second electrodes, on which charges of a second polarity are produced when an X-axis component of force is applied to said working body, are connectable to said second detection terminal (Bx), wherein four electrodes (41, 32, 33, 44) among said first and second electrodes, on which charges of the first polarity are produced when an Z-axis component of force is applied to said working body, are connectable to said third detection terminal (Az), wherein four electrodes (31, 42, 43, 34) among said first and second electrodes, on which charges of the second polarity are produced when an Z-axis component of force is applied to said working body, are connectable to said fourth detection terminal (Bz), to detect said X-axis component of force applied to said working body on the basis of a potential difference (Vx) across said first and second detection terminals, and to detect said Z-axis component of force applied to said working body on the basis of a potential difference (Vz) across said third and fourth detection terminals.

14. A force sensor comprising a substrate (10), a working body (50), a sensor casing (60) and eight detection elements (D1–D8), each of said detection elements comprising a piezoelectric element (21-24) in a plate form, a first electrode (31-38) formed on a first surface of said piezoelectric element, and a second electrode (41-48) formed on a second surface of said piezoelectric element, wherein an origin (O) is defined at a point within said substrate (10), an X-axis is defined so that it passes through said origin and extends in a direction parallel to a substrate surface of said substrate, a Y-axis is defined so that it is perpendicular to said X-axis at said origin and it extends in a direction parallel to said substrate surface, and an inside area including said origin and an outside area surrounding said inside area are defined on said substrate surface, wherein first, second, third and fourth detection elements (D1–D4) of said eight detection elements are respectively arranged along said X-axis in such a manner that said first detection element (D1) is in a negative region of said X-axis in said outside area, said second detection element (D2) is in the negative region of said X-axis in said inside area, said third detection element (D3) is in a positive region of said X-axis in said inside area, and said fourth detection element (D4) is in the positive region of the X-axis in said outside area, and the respective second electrodes (41–44) of said first to fourth detection elements are fixed on said substrate, wherein fifth, sixth, seventh and eighth detection elements (D5–D8) of said eight detection elements are respectively arranged along said Y-axis in such a manner that said fifth detection element (D5) is in a negative region of said Y-axis in said outside area, said sixth detection element (D6) is in the negative region of said Y-axis in said inside area, said seventh detection element (D7) is in a positive region of said Y-axis in said inside area, and said eighth detection element (D8) is in the positive region of said Y-axis in said outside area, and the respective second electrodes (45–48) of said fifth to eighth detection elements are fixed on said substrate, wherein a peripheral portion of said substrate is fixed to said sensor casing (60), wherein said working body (50) is fixed to said substrate so as to transmit a force applied to said working body to said origin, wherein said substrate having enough flexibility to transmit a force applied to said working body to said detection elements, and said force sensor further comprising a first detection terminal (Ax), a second detection terminal (Bx), a third detection terminal (Ay) and a fourth detection terminal (By), wherein four electrodes (41, 32, 43, 34) among said first and second electrodes of said first to fourth detection elements, on which charges of a first polarity are produced when an X-axis component of force is applied to said working body, are connectable to said first detection terminal (Ax), wherein four electrodes (31, 42, 33, 44) among said first and second electrodes of said first to fourth detection elements, on which charges of a second polarity are produced when an X-axis component of force is applied to said working body, are connectable to said second detection terminal (Bx), wherein four electrodes (45, 36, 47, 38) among said first and second electrodes of said fifth to eighth detection elements, on which charges of the first polarity are produced when an Y-axis component of force is applied to said working body, are connectable to said third detection terminal (Ay), wherein four electrodes (35, 46, 37, 48) among said first and second electrodes of said fifth to eighth detection elements, on which charges of the second polarity are produced when an Y-axis component of force is applied to said working body, are connectable to said fourth detection terminal (By), to detect said X-axis component of force applied to said working body on the basis of a potential difference (Vx) across said first and second detection terminals, and to detect said Y-axis component of force applied to said working body on the basis of a potential difference (Vy) across said third and fourth detection terminals.

15. A force sensor comprising a substrate (10), a working body (51), a sensor casing (61) and eight detection elements (D1–D8), each of said detection elements comprising a piezoelectric element (21–24) in a plate form, a first electrode (31–38) formed on a first surface of said piezoelectric element, and a second electrode (41–48) formed on a second surface of said piezoelectric element, wherein an origin (O) is defined at a point within said substrate (10), an X-axis is defined so that it passes through said origin and extends in a direction parallel to a substrate surface of said substrate, a Y-axis is defined so that it is perpendicular to said X-axis at said origin and it extends in a direction parallel to said substrate surface, and an inside area including said origin and an outside area surrounding said inside area are defined in said substrate surface, wherein first, second, third and fourth detection elements (D1–D4) of said eight detection elements are respectively arranged along said X-axis in such a manner that said first detection element (D1) is in a negative region of said X-axis in said outside area, said second detection element (D2) is in the negative region of said X-axis in said inside area, said third detection element (D3) is in a positive region of said X-axis in said inside area, and said fourth detection element (D4) is in the positive region of the X-axis in said outside area, and the respective second electrodes (41–44) of said first to fourth detection elements are fixed on said substrate, wherein fifth, sixth, seventh and eighth detection elements (D5–D8) of said eight detection elements are respectively arranged along said Y-axis in such a manner that said fifth detection element (D5) is in a negative region of said Y-axis in said outside area, said sixth detection element (D6) is in the negative region of said Y-axis in said inside area, said seventh detection element (D7) is in a positive region of said Y-axis in said inside area, and said eighth detection element (D8) is in the positive region of said Y-axis in said outside area, and the respective second electrodes (45–48) of said fifth to eighth detection elements are fixed on said substrate, wherein a portion in a vicinity of said origin of said substrate is fixed to said sensor casing (61), wherein said working body (51) is fixed to said substrate so as to transmit a force applied to said working body to a peripheral portion of said substrate, wherein said substrate having enough flexibility to transmit a force applied to said working body to said detection elements, and said force sensor further comprising a first detection terminal (Ax), a second detection terminal (Bx), a third detection terminal (Ay) and a fourth detection terminal (By), wherein four electrodes (41, 32, 43, 34) among said first and second electrodes of said first to fourth detection elements, on which charges of a first polarity are produced when an X-axis component of force is applied to said working body, are connectable to said first detection terminal (Ax), wherein four electrodes (31, 42, 33, 44) among said first and second electrodes of said first to fourth detection elements, on which charges of a second polarity are produced when an X-axis component of force is applied to said working body, are connectable to said second detection terminal (Bx), wherein four electrodes (45, 36, 47, 38) among said first and second electrodes of said fifth to eighth detection elements, on which charges of the first polarity are produced when an Y-axis component of force is applied to said working body, are connectable to said third detection terminal (Ay), wherein four electrodes (35, 46, 37, 48) among said first and second electrodes of said fifth to eighth detection elements, on which charges of the second polarity are produced when an Y-axis component of force is applied to said working body, are connectable to said fourth detection terminal (By), to detect said X-axis component of force applied to said working body on the basis of a potential difference (Vx) across said first and second detection terminals, and to detect said Y-axis component of force applied to said working body on the basis of a potential difference (Vy) across said third and fourth detection terminals.

16. A force sensor comprising a substrate (10), a working body (50), a sensor casing (60) and twelve detection elements (D1–D12), each of said detection elements comprising a piezoelectric element in a plate form, a first electrode formed on a first surface of said piezoelectric element, and a second electrode formed on a second surface of said piezoelectric element, wherein an origin (O) is defined at a point within said substrate (10), an X-axis is defined so that it passes through said origin and extends in a direction parallel to a substrate surface of said substrate, a Y-axis is defined so that it is perpendicular to said X-axis at said origin and it extends in a direction parallel to said substrate surface, a Z-axis is defined so that it passes through said origin and extends in a direction perpendicular to said substrate surface, a W-axis is defined so that it intersects with said respective axes of X, Y and Z at said origin and extends in a direction parallel to said substrate surface, and an inside area including said origin and an outside area surrounding said inside area are defined on said substrate surface, wherein first, second, third and fourth detection elements (D1–D4) of said twelve sets of detection elements are respectively arranged along said X-axis in such a manner that said first detection element (D1) is in a negative region of said X-axis in said outside area, said second detection element (D2) is in the negative region of said X-axis in said inside area, said third detection element (D3) is in a positive region of said X-axis in said inside area, and said fourth detection element (D4) is in the positive region of said X-axis in said outside area, and the respective second electrodes of said first to fourth detection elements are fixed on said substrate, wherein fifth, sixth, seventh and eighth detection elements (D5–D8) of said twelve detection elements are respectively arranged along said Y-axis in such a manner that said fifth detection element (D5) is in a negative region of said Y-axis in said outside area, said sixth detection element (D6) is in the negative region of said Y-axis in said inside area, said seventh detection element (D7) is in a positive region of said Y-axis in said inside area, and said eighth detection element (D8) is in the positive region of said Y-axis in said outside area, and the respective second electrodes of said fifth to eighth detection elements are fixed on said substrate, wherein ninth, tenth, eleventh and twelfth detection elements (D9–D12) of said twelve detection elements are respectively arranged along said W-axis in such a manner that said ninth detection element (D9) is in a negative region of said W-axis in said outside area, said tenth detection element (D10) is in negative region of said W-axis in said inside area, said eleventh detection element (D11) is in a positive region of said W-axis in said inside area, and a twelfth detection element (D12) is in the positive region of said W-axis in said outside area, and the respective second electrodes of said ninth to twelfth detection elements are fixed on said substrate, wherein a peripheral portion of said substrate is fixed to said sensor casing (60), wherein said working body (50) is fixed to said substrate so as to transmit a force applied to said working body to said origin, wherein said substrate having enough flexibility to transmit a force applied to said working body to said detection elements, and said force sensor further comprising a first detection terminal (Ax), a second detection terminal (Bx), a third detection terminal (Ay) a fourth detection terminal (By), a fifth detection terminal (Az) and a sixth detection terminal (Bz), wherein four electrodes (41, 32, 43, 34) among said first and second electrodes of said first to fourth detection elements, on which charges of a first polarity are produced when an X-axis component of force is applied to said working body, are connectable to said first detection terminal (Ax), wherein four electrodes (31, 42, 33, 44) among said first and second electrodes of said first to fourth detection elements, on which charges of a second polarity are produced when an X-axis component of force is applied to said working body, are connectable to said second detection terminal (Bx), wherein four electrodes (45, 36, 47, 38) among said first and second electrodes of said fifth to eighth detection elements, on which charges of the first polarity are produced when an Y-axis component of force is applied to said working body, are connectable to said third detection terminal (Ay), wherein four electrodes (35, 46, 37, 48) among said first and second electrodes of said fifth to eighth detection elements, on which charges of the second polarity are produced when an Y-axis component of force is applied to said working body, are connectable to said fourth detection terminal (By), wherein four electrodes among said first and second electrodes of said ninth to twelfth detection elements, on which charges of the first polarity are produced when an Z-axis component of force is applied to said working body, are connectable to said fifth detection terminal (Az), wherein four electrodes among said first and second electrodes of said ninth to twelfth detection elements, on which charges of the second polarity are produced when an Z-axis component of force is applied to said working body, are connectable to said sixth detection terminal (Bz), to detect said X-axis component of force applied to said working body on the basis of a potential difference across said first and second detection terminals, to detect said Y-axis component of force applied to said working body on the basis of a potential difference across said third and fourth detection terminals, and to detect said Z-axis component of force applied to said working body on the basis of a potential difference across said fifth and sixth detection terminals.

17. A force sensor comprising a substrate (10), a working body (51), a sensor casing (61) and twelve detection elements (D1–D12), each of said detection elements comprising a piezoelectric element in a plate form, a first electrode formed on a first surface of said piezoelectric element, and a second electrode formed on a second surface of said piezoelectric element, wherein an origin (O) is defined at a point within said substrate (10), an X-axis is defined so that it passes through said origin and extends in a direction parallel to a substrate surface of said substrate, a Y-axis is defined so that it is perpendicular to said X-axis at said origin and it extends in a direction parallel to said substrate surface, a Z-axis is defined so that it passes through said origin and extends in a direction perpendicular to said substrate surface, a W-axis is defined so that it intersects with said respective axes of X, Y and Z at said origin and extends in a direction parallel to said substrate surface, and an inside area including said origin and an outside area surrounding said inside area are defined on said substrate surface, wherein first, second, third and fourth detection elements (D1–D4) of said twelve sets of detection elements are respectively arranged along said X-axis in such a manner that said first detection element (D1) is in a negative region of said X-axis in said outside area, said second detection element (D2) is in the negative region of said X-axis in said inside area, said third detection element (D3) is in a positive region of said X-axis in said inside area, and said fourth detection element (D4) is in the positive region of said X-axis in said outside area, and the respective second electrodes of said first to fourth detection elements are fixed on said substrate, wherein fifth, sixth, seventh and eighth detection elements (D5–D8) of said twelve detection elements are respectively arranged along said Y-axis in such a manner that said fifth detection element (D5) is in a negative region of said Y-axis in said outside area, said sixth detection element (D6) is in the negative region of said Y-axis in said inside area, said seventh detection element (D7) is in a positive region of said Y-axis in said inside area, and said eighth detection element (D8) is in the positive region of said Y-axis in said outside area, and the respective second electrodes of said fifth to eighth detection elements are fixed on said substrate, wherein ninth, tenth, eleventh and twelfth-detection elements (D9–D12) of said twelve detection elements are respectively arranged along said W-axis in such a manner that said ninth detection element (D9) is in a negative region of said W-axis in said outside area, said tenth detection element (D10) is in negative region of said W-axis in said inside area, said eleventh detection element (D11) is in a positive region of said W-axis in said inside area, and a twelfth detection element (D12) is in the positive region of said W-axis in said outside area, and the respective second electrodes of said ninth to twelfth detection elements are fixed on said substrate, wherein a portion in a vicinity of said origin of said substrate is fixed to said sensor casing (61), wherein said working body (51) is fixed to said substrate so as to transmit a force applied to said working body to a peripheral portion of said substrate, wherein said substrate having enough flexibility to transmit a force applied to said working body to said detection elements, and said force sensor further comprising a first detection terminal (Ax), a second detection terminal (Bx), a third detection terminal (Ay) a fourth detection terminal (By), a fifth detection terminal (Az) and a sixth detection terminal (Bz), wherein four electrodes (41, 32, 43, 34) among said first and second electrodes of said first to fourth detection elements, on which charges of a first polarity are produced when an X-axis component of force is applied to said working body, are connectable to said first detection terminal (Ax), wherein four electrodes (31, 42, 33, 44) among said first and second electrodes of said first to fourth detection elements, on which charges of a second polarity are produced when an X-axis component of force is applied to said working body, are connectable to said second detection terminal (Bx), wherein four electrodes (45, 36, 47, 38) among said first and second electrodes of said fifth to eighth detection elements, on which charges of the first polarity are produced when an Y-axis component of force is applied to said working body, are connectable to said third detection terminal (Ay), wherein four electrodes (35, 46, 37, 48) among said first and second electrodes of said fifth to eighth detection elements, on which charges of the second polarity are produced when an Y-axis component of force is applied to said working body, are connectable to said fourth detection terminal (By), wherein four electrodes among said first and second electrodes of said ninth to twelfth detection elements, on which charges of the first polarity are produced when an Z-axis component of force is applied to said working body, are connectable to said fifth detection terminal (Az), wherein four electrodes among said first and second electrodes of said ninth to twelfth detection elements, on which charges of the second polarity are produced when an Z-axis component of force is applied to said working body, are connectable to said sixth detection terminal (Bz), to detect said X-axis component of force applied to said working body on the basis of a potential difference across said first and second detection terminals, to detect said Y-axis component of force applied to said working body on the basis of a potential difference across said third and fourth detection terminals, and to detect said Z-axis component of force applied to said working body on the basis of a potential difference across said fifth and sixth detection terminals.

18. A force sensor comprising a substrate (10), a working body (50), a sensor casing (60) and four detection elements (D1, D2, D3, D4), each of said detection elements comprising a piezoelectric element (21, 23) in a plate form and a first electrode (31, 32, 33, 34) formed on a first surface of said piezoelectric element, and said substrate including four second electrodes (41, 42, 43, 44) formed on a surface thereof, wherein an origin (O) is defined at a point within said substrate (10) and an X-axis is defined so that it passes through said origin and extends in a direction parallel to the surface of said substrate, said four second electrodes being arranged along said X-axis in such a manner that two of said detection elements (D3, D4) are located on one side of said origin and two of said detection elements (D1, D2) are located on an opposite side of said origin, and each of said four detection elements being arranged on each of said four second electrodes (41, 42, 43, 44), respectively, in such a manner that a second surface of each detection element is fixed to each second electrode, wherein a peripheral portion of said substrate is fixed to said sensor casing (60), wherein said working body (50) is fixed to said substrate so as to transmit a force applied to said working body to said origin, wherein said substrate having enough flexibility to transmit a force applied to said working body to said detection elements, said force sensor further comprising a first detection terminal (Ax) and a second detection terminal (Bx), wherein four electrodes (41, 32, 43, 34), among said first and second electrodes, on which charges of a first polarity are produced when an X-axis component of force is applied to said working body, are connected to said first detection terminal (Ax), and wherein four electrodes (31, 42, 33, 44), among said first and second electrodes, on which charges of a second polarity are produced when said X-axis component of force is applied to said working body, are connected to said second detection terminal (Bx), thus to detect said X-axis component of force applied to said working body on the basis of a potential difference between said first detection terminal and said second detection terminal.

19. A force sensor comprising a substrate (10), a working body (51), a sensor casing (61) and four detection elements (D1, D2, D3, D4), each of said detection elements comprising a piezoelectric element (21, 23) in a plate form and a first electrode (31, 32, 33, 34) formed on a first surface of said piezoelectric element, and said substrate including four second electrodes (41, 42, 43, 44) formed on a surface thereof, wherein an origin (O) is defined at a point within said substrate (10) and an X-axis is defined so that it passes through said origin and extends in a direction parallel to the surface of said substrate, said four second electrodes being arranged along said X-axis in such a manner that two of said detection elements (D3, D4) are located on one side of said origin and two of said detection elements (D1, D2) are located on an opposite side of said origin, and each of said four detection elements being arranged on each of said four second electrodes (41, 42, 43, 44), respectively, in such a manner that a second surface of each detection element is fixed to each second electrode, wherein a portion in a vicinity of said origin of said substrate is fixed to said sensor casing (61), wherein said working body (51) is fixed to said substrate so as to transmit a force applied to said working body to a peripheral portion of said substrate, wherein said substrate having enough flexibility to transmit a force applied to said working body to said detection elements, said force sensor further comprising a first detection terminal (Ax) and a second detection terminal (Bx), wherein four electrodes (41, 32, 43, 34), among said first and second electrodes, on which charges of a first polarity are produced when an X-axis component of force is applied to said working body, are connected to said first detection terminal (Ax), and wherein four electrodes (31, 42, 33, 44), among said first and second electrodes, on which charges of a second polarity are produced when said X-axis component of force is applied to said working body, are connected to said second detection terminal (Bx), thus to detect said X-axis component of force applied to said working body on the basis of a potential difference between said first detection terminal and said second detection terminal.

20. A force sensor comprising a substrate (10), a working body (50), a sensor casing (60) and four detection elements (D1, D2, D3, D4), each of said detection elements comprising a piezoelectric element (21, 23) in a plate form, a first electrode (31, 32, 33, 34) formed on a first surface of said piezoelectric element, and a second electrode (41, 42, 43, 44) formed on a second surface of said piezoelectric element, wherein an origin (O) is defined at a point within said substrate (10) and an X-axis is defined so that it passes through said origin and extends in a direction parallel to a substrate surface of said substrate, said four detection elements being arranged along said X-axis in such a manner that two of said detection elements (D3, D4) are located on one side of said origin and two of said detection elements (D1, D2) are located on an opposite side of said origin, and the respective second electrodes (41, 42, 43, 44) of said respective detection elements are fixed on said substrate, wherein a peripheral portion of said substrate is fixed to said sensor casing (60), wherein said working body (50) is fixed to said substrate so as to transmit a force applied to said working body to said origin, wherein said substrate having enough flexibility to transmit a force applied to said working body to said detection elements, wherein potentials of said first electrodes (31, 32, 33, 34) with respect to said second electrodes (41, 42, 43, 44) fixed on said substrate in said respective detection elements are obtained, and wherein an X-axis component of force applied to said working body is detected on the basis of a difference between a first sum (V1+V3) of potentials on two of said four detection elements having a first polarity and a second sum (V2+V4) of potentials on the other two of said four detection elements having a second polarity.

21. A force sensor comprising a substrate (10), a working body (51), a sensor casing (61) and four detection elements (D1, D2, D3, D4), each of said detection elements comprising a piezoelectric element (21, 23) in a plate form, a first electrode (31, 32, 33, 34) formed on a first surface of said piezoelectric element, and a second electrode (41, 42, 43, 44) formed on a second surface of said piezoelectric element, wherein an origin (O) is defined at a point within said substrate (10) and an X-axis is defined so that it passes through said origin and extends in a direction parallel to a substrate surface of said substrate, said four detection elements being arranged along said X-axis in such a manner that two of said detection elements (D3, D4) are located on one side of said origin and two of said detection elements (D1, D2) are located on an opposite side of said origin, and the respective second electrodes (41, 42, 43, 44) of said respective detection elements are fixed on said substrate, wherein a portion in a vicinity of said origin of said substrate is fixed to said sensor casing (61), wherein said working body (51) is fixed to said substrate so as to transmit a force applied to said working body to a peripheral portion of said substrate, wherein said substrate having enough flexibility to transmit a force applied to said working body to said detection elements, wherein potentials of said first electrodes (31, 32, 33, 34) with respect to said second electrodes (41, 42, 43, 44) fixed on said substrate in said respective detection elements are obtained, and wherein an X-axis component of force applied to said working body is detected on the basis of a difference between a first sum (V1+V3) of potentials on two of said four detection elements having a first polarity and a second sum (V2+V4) of potentials on the other two of said four detection elements having a second polarity.

22. A force sensor comprising a substrate (10), a working body (50), a sensor casing (60) and four detection elements (D1, D2, D3, D4), each of said detection elements comprising a piezoelectric element (21, 23) in a plate form and a first electrode (31, 32, 33, 34) formed on a first surface of said piezoelectric element, and said substrate including four second electrodes (41, 42, 43, 44) formed on a surface thereof, wherein an origin (O) is defined at a point within said substrate (10) and an X-axis is defined so that it passes through said origin and extends in a direction parallel to the surface of said substrate, said four second electrodes being arranged along said X-axis in such a manner that two of said detection elements (D3, D4) are located on one side of said origin and two of said detection elements (D1, D2) are located on an opposite side of said origin, and each of said four detection elements being arranged on each of said four second electrodes (41, 42, 43, 44), respectively, in such a manner that a second surface of each detection element is fixed to each second electrode, wherein a peripheral portion of said substrate is fixed to said sensor casing (60), wherein said working body (50) is fixed to said substrate so as to transmit a force applied to said working body to said origin, wherein said substrate having enough flexibility to transmit a force applied to said working body to said detection elements, wherein potentials of said first electrodes (31, 32, 33, 34) with respect to said second electrodes (41, 42, 43, 44) fixed on said substrate in said respective detection elements are obtained, and wherein an X-axis component of force applied to said working body is detected on the basis of a difference between a first sum (V1+V3) of potentials of two of said four detection elements having a first polarity and a second sum (V2+V4) of potentials of the other two of said four detection elements having a second polarity.

23. A force sensor comprising a substrate (10), a working body (51), a sensor casing (61) and four detection elements (D1, D2, D3, D4), each of said detection elements comprising a piezoelectric element (21, 23) in a plate form and a first electrode (31, 32, 33, 34) formed on a first surface of said piezoelectric element, and said substrate including four second electrodes (41, 42, 43, 44) formed on a surface thereof, wherein an origin (O) is defined at a point within said substrate (10) and an X-axis is defined so that it passes through said origin and extends in a direction parallel to the surface of said substrate, said four second electrodes being arranged along said X-axis in such a manner that two of said detection elements (D3, D4) are located on one side of said origin and two of said detection elements (D1, D2) are located on an opposite side of said origin, and each of said four detection elements being arranged on each of said four second electrodes (41, 42, 43, 44), respectively in such a manner that a second surface of each detection element is fixed to each second electrode, wherein a portion in a vicinity of said origin of said substrate is fixed to said sensor casing (61), wherein said working body (51) is fixed to said substrate so as to transmit a force applied to said working body to a peripheral portion of said substrate, wherein said substrate having enough flexibility to transmit a force applied to said working body to said detection elements, wherein potentials of said first electrodes (31, 32, 33, 34) with respect to said second electrodes (41, 42, 43, 44) fixed on said substrate in said respective detection elements are obtained, and wherein an X-axis component of force applied to said working body is detected on the basis of a difference between a first sum (V1+V3) of potentials of two of said four detection elements having a first polarity and a second sum (V2+V4) of potentials of the other two of said four detection elements having a second polarity.

* * * * *